(12) United States Patent
Hitomi

(10) Patent No.: US 6,528,201 B1
(45) Date of Patent: *Mar. 4, 2003

(54) ELECTRODE FOR FUEL CELL AND PROCESS FOR PRODUCING THE SAME

(75) Inventor: Shuji Hitomi, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/670,344

(22) Filed: Sep. 27, 2000

(30) Foreign Application Priority Data

| Sep. 27, 1999 | (JP) | 11-272166 |
| Sep. 30, 1999 | (JP) | 11-278308 |
| Oct. 19, 1999 | (JP) | 11-297302 |
| Oct. 21, 1999 | (JP) | 11-300227 |
| Dec. 9, 1999 | (JP) | 11-350184 |

(51) Int. Cl.⁷ .............. H01M 4/86; H01M 4/88
(52) U.S. Cl. ................................. 429/42; 502/101
(58) Field of Search ....................... 429/42; 502/101

(56) References Cited

U.S. PATENT DOCUMENTS

| 5,677,074 A | * 10/1997 | Serpico et al. ............ 429/42 X |
| 5,846,670 A | * 12/1998 | Watanabe et al. ............. 429/42 |
| 5,958,616 A | * 9/1999 | Salinas et al. ............ 429/42 X |
| 6,015,635 A | * 1/2000 | Kawahara et al. ............ 429/42 |
| 6,309,772 B1 | * 10/2001 | Zuber et al. ............ 429/42 X |
| 6,344,291 B1 | * 2/2002 | Hitomi ........................ 429/42 |

FOREIGN PATENT DOCUMENTS

| JP | 9-087882 | * 3/1997 | ........... H01M/4/88 |
| JP | 11-217687 | 8/1999 | |
| JP | 11-217688 | 8/1999 | |

* cited by examiner

Primary Examiner—Stephen Kalafut
(74) Attorney, Agent, or Firm—Sughrue Mion, PLLC

(57) ABSTRACT

An electrode for fuel cell is made of a solid polymer electrolyte-catalyst composite electrode containing a cation-exchange resin, carbon particles and a catalyst metal. The catalyst metal is loaded mainly on the surface of the carbon particles in contact with the proton-conductive passage in the cation-exchange resin. Preferably, the catalyst metal has a nucleus containing a metal (X) and an outer layer containing a metal (Y) which is not contained in the nucleus.

32 Claims, 5 Drawing Sheets

ELECTRODE FOR FUEL CELL AND PROCESS FOR PRODUCING THE SAME

BACKGROUND OF THE INVENTION

1. Field of the Invention

The present invention relates to an electrode for fuel cell and a process for the production thereof.

2. Description of the Related Art

A solid polymer electrolyte type fuel cell (PEFC) is composed of as an electrolyte of a cation-exchange membrane which is a solid polymer electrolyte such as perfluorocarbonsulfonic acid membrane and an anode and cathode connected to the ion-exchange membrane on the respective side thereof. In operation, hydrogen is supplied into the anode while oxygen is supplied into the cathode so that an electrochemical reaction occurs to generate electricity. The electrochemical reaction occurring on these electrodes will be shown below.

Anode: $H_2 \rightarrow 2H^+ + 2e^-$

Cathode: $1/2 O_2 + 2H + + 2e^- \rightarrow H_2O$

Total reaction: $H^2 + 1/2 O_2 \rightarrow H_2O$

As can be seen in these reaction formulae, the reaction on the electrodes proceed only on the three-phase boundary site where gas of the active materials, i.e., (hydrogen or oxygen), proton ($H^+$) and electron ($e^-$) can be received and released at the same time.

An example of the electrode for fuel cell having such a function is a solid polymer electrolyte-catalyst composite electrode made of a cation-exchange resin as a solid polymer electrolyte, carbon particles and a catalyst metal. An example of the structure of a cation-exchange resin-catalyst composite electrode made of a cation-exchange resin as a solid polymer electrolyte, carbon particles supporting a catalyst metal showing a high catalytic activity for the reduction reaction of oxygen and the oxidation reaction of hydrogen is shown in FIG. 9. In FIG. 9, the reference numeral 1a indicates a carbon particle, the reference numeral 2a indicates a cation-exchange resin, the reference numeral 3a indicates an ion-exchange membrane, and the reference numeral 4a indicates a pore. As can be seen in FIG. 9, the carbon particles 1a supporting a catalyst metal and the cation-exchange resin 2a are three-dimensionally distributed and a plurality of pores 4a are formed in the porous electrode. The carbon as a support of catalyst metal forms an electron-conductive channel. The cation-exchange resin forms a proton-conductive channel. The pores form a channel for supplying oxygen or hydrogen and discharging water as a product. Further, these three channels are three-dimensionally spread in the electrode to form numerous three-phase boundaries at which gas, proton ($H^+$) and electron ($e^-$) can be received and released at the same time, thereby providing a site for electrode reaction.

The electrode having such a structure has heretofore been prepared by a process including applying a paste made of a carbon particle supporting highly dispersed a catalyst metal particles such as platinum and suspension of PTFE (polytetrafluoroethylene) particles to a polymer film or electrically-conductive porous carbon substrate to form a film of the paste (normally to a thickness of from 3 µm to 30 µm), heating and drying the film, followed by applying a cation-exchange resin solution to the film so that the film is impregnated with the cation-exchange resin solution, and then drying the film or a process including applying a paste made of the foregoing carbon particle supporting catalyst, a cation-exchange resin solution and optionally PTFE particles to a polymer film or electrically-conductive porous carbon electrode substrate to form a film of the paste (normally to a thickness of from 3 µm to 30 µm), and then drying the film. As the cation-exchange resin solution there is used one obtained by dissolving a material having the same composition as the previously mentioned ion-exchange membrane in an organic solvent such as alcohol or a mixture of an organic solvent and water to form a liquid like solution. As the suspension of PTFE particles there is used a suspension of PTFE particles having a diameter of about 0.23 µm.

PEFC is expensive. This prevents PEFC from being put in practical use. In particular, metals belonging to the platinum group which are used as catalyst are expensive. This is a major factor causing the rise of the cost of PEFC. Therefore, how the amount of platinum group metal as catalyst metal to be supported on the electrode can be reduced is the key to technical development in the art.

The conventional electrode used a catalyst metal particle belonging to a platinum group metal supported on carbon. The activity of the electrode depends greatly on the surface of the platinum group metal particle. Therefore, it is an ordinary practice to reduce the particle diameter of the platinum group metal and hence increase the surface area of the platinum group metal per unit weight thereof, enhancing the catalytic activity per unit weight of the platinum group metal. At present, carbon supporting a platinum group metal having an average particle diameter of about 4 nm is used as a catalyst metal. However, it is necessary to support a platinum group metal both on the cathode and anode in an amount as great as 0.4 mg/cm² or more in order to obtain sufficient characteristics for practical use. Further, the conventional electrode prepared by the production processes described above shows a reduced percent utilization of the catalyst metal supported on carbon, e.g., only about 10%, further lowering the activity against the total electrode reactions (see Edson A. Tisianelli, "J. Electroanal. Chem.", 251, 275, 1988). This is attributed to the fact that the conventional production processes involve the mixing of carbon particles supporting a catalyst metal particle such as platinum supported thereon with a cation-exchange resin. In other words, the carbon particle as a support has a particle diameter as small as 30 nm for example. The carbon particle to be mixed with the cation-exchange resin solution is composed of aggregates of some carbon particles having considerably dense roughness formed on the surface thereof. On the other hand, the cation-exchange resin solution has a certain viscosity and thus cannot penetrate deep into the central portions of the aggregate of carbon particles even by a process including impregnating the dispersion film layer made of carbon particles and PTFE particles with a cation-exchange resin solution or a process including the use of a paste obtained by mixing carbon particles, PTFE particles and a cation-exchange resin solution. This phenomenon makes it impossible to form a three-phase boundary in the deep portion in the aggregate of carbon particles. Therefore, the catalyst metal particle positioned at this portion takes no part in electrode reaction, causing a drop of the percent utilization of the catalyst metal. The structure of such an electrode is shown in FIG. 10. As shown in FIG. 10, carbon particles 3b supporting catalyst particles 1b and 2b gather together to form an aggregate of carbon particles (4 piece of carbon particles constituting an aggregate in this figure). In this arrangement, since cation-exchange resin 4b doesn't penetrate into a deep portion 5b of the aggregate of carbon particles, the catalyst particles 1b which are positioned on the contact area of carbon particle with the cation-exchange resin effectively act on the electrode reaction and a catalyst particle 2b which has no area in contact with the cation-exchange resin doesn't effectively act on the electrode reaction.

In order to enhance the percent utilization of catalyst metal, studies have been made of supporting of a catalyst metal on the portion where the surface of carbon particle contacts a cation-exchange resin (the state shown in FIG. 10 excluding the catalyst particles 2b). However, the mere study of how the carbon supporting catalyst and the cation-exchange resin are three-dimensionally arranged in the electrode on the basis of the conventional macroscopic consideration of the structure of three-phase boundary in the electrode is limited sufficient for the drastic enhancement of the percent utilization of catalyst metal. More detailed approach from the micro structure of three-phase boundary in the electrode has been requested to make its drastic improvement.

As reported in, e.g., H. L. Yeager et al., "J. Electrochem. Soc.," 128, 1880, 1981, and Kokumi et al, "J. Electrochem. Soc.," 132, 2601, 1985, the microscopic observation of the structure of a cation-exchange resin shows that a cation-exchange resin has a proton-conductive passage, called as a cluster formed by a hydrophilic exchange functional group and its counter ions with water, and a hydrophobic backbone moiety made of Teflon, etc. Considering deeply these aspects, a gas (hydrogen or oxygen) as an active reaction material and water as a product of the cathode, not to mention proton, must transport through the proton-conductive passage but not through the hydrophobic backbone. Therefore, the inventor concluded from the microscopic further-considerations of electrode reaction that the three-phase boundary on which the reaction of electrode for fuel cell proceeds exists only on the site where the surface of the carbon particles contacts the proton-conductive passage in the cation-exchange resin. It means that the positional relationship of the catalyst metal with the proton-conductive passage in the cation-exchange resin and the distribution of the catalyst metal in the proton-conductive passage need to be more studied. In other words, the conventional processes for the production of an electrode for fuel cell, as previously mentioned, involving the mixing of carbon particles supporting a catalyst metal particle such as platinum supported thereon with a cation-exchange resin solution is considered to be inefficient method with the poor expectation that the catalyst metal particle such as platinum supported on carbon particles happens to contact the proton-conductive passage in the cation-exchange resin, resulting in the lower utilization of catalyst metal.

FIG. 11 is diagram illustrating the surface layer of a carbon particle in contact with the cation-exchange resin in the conventional electrode (what is further magnified diagram of the portion of FIG. 10 where the carbon particle contacts the carbon-exchanging resin). In FIG. 11, the reference numeral 1 indicates a carbon particle, the reference numeral 2 indicates a proton-conductive passage called a cluster of cation-exchange resin, the reference numeral 3 indicates the Teflon backbone of the cation-exchange resin, and the reference numerals 4 and 5 indicate a catalyst metal particle. As shown in FIG. 11 for example, the surface of the carbon particle 1 is covered with a cation-exchange resin composed of a proton-conductive passage 2 and a fluorocarbon backbone 3. The catalyst metal particles 4 and 5 are supported on the surface of the carbon particle 1. The catalyst metal particle 5 is located at the site of the proton-conductive passage 2 in the cation-exchange resin and thus can effectively act as a catalyst. On the contrary, the catalyst metal particle 4 is located at the site of the Teflon backbone 3 in the cation-exchange resin and thus cannot effectively act as a catalyst. Further, the region Z has a three-phase boundary formed therein but has no catalyst metal particle and this site takes no part in the reaction. In other words, in this kind of an electrode, the presence of the catalyst metal particle 4 causes a drop of the percent utilization of catalyst metal and the presence of the three-phase boundary Z causes a drop of the activity of the electrode.

Another problem with the conventional electrode for fuel cell will be described hereinafter. Examples of the fuel cell include those using hydrogen and methanol as a fuel. In the case where hydrogen is used as a fuel, methanol is stored on board taking into account the utility. Using a reformer utilizing the chemical reaction of methanol with water, methanol is converted to hydrogen in a required amount. The hydrogen thus produced is then supplied into PEFC. PEFC used for this purpose is a fuel cell using reformed fuel gas of methanol. On the other hand, in the latter case where methanol is used as a fuel, methanol is directly supplied into PEFC where it is direct electrochemically oxidized. PEFC used for this purpose is a direct methanol fuel cell (DMFC: Direct Methanol Fuel Cell). In these cases where such fuels are used, unlike in the case where pure hydrogen is used, anode is required to exhibit a high CO tolerance or high methanol oxidation properties. However, mere use of platinum cannot provide such properties. It is known that an activity which cannot be obtained by the use of a single platinum group metal element, e.g., CO tolerance can be obtained by alloying two or more metal elements, including platinum group metal element. Therefore, a platinum-ruthenium alloy is supported on the anode for PEFC using reformed fuel gas of methanol fuel cell. This attempt turns to good results when the amount of an alloy of two or more metals, including platinum group metal element, supported on carbon particles is large. However, when it is attempted to reduce the amount of an alloy of two or more metals, including platinum group metal element, supported on carbon particles for the purpose of lowering PEFC cost, this attempt does not necessarily turn to good results. This is because even when it is attempted to allow carbon particles having a remarkably large surface area per unit weight to be impregnated simultaneously or sequentially with two or more catalyst metals, including platinum group metal element, so that these metal elements are alloyed, the two or more metal elements, including platinum group metal element, are each independently dispersed to a high extent, drastically lowering the percent alloying. Thus, the desired CO tolerance and activity for the electrochemical oxidation reaction of methanol are deteriorated.

SUMMARY OF THE INVENTION

It is an object of the present invention to enhance the percent utilization of catalyst in an electrode for fuel cell and improve the properties thereof by improving the microscopic structure of three-phase boundary in the electrode and the structure of catalyst metal particles itself.

An electrode for fuel cell according to the invention comprises a solid polymer electrolyte-catalyst composite electrode containing a cation-exchange resin, carbon particles and a catalyst metal, the catalyst metal being loaded mainly on the site where the surface of the carbon particles contacts the proton-conductive passage in the cation-exchange resin. Preferably, the catalyst metal has a nucleus containing a metal (X) and a shell containing a metal (Y) which is not contained in the nucleus.

A process for the production of an electrode for fuel cell comprising a first step (absorption step) of absorbing a cation of a catalyst metal element into a cation-exchange resin in a mixture of its resin and carbon particles by ion-exchange reaction between a counter ion of the resin and the cations, and a second step (reduction step) of chemically reducing the cations in the mixture obtained at the first step. Preferably, a process for the production of a n electrode comprising, a first step of absorbing a cation of a catalyst metal element (X') into a cation-exchange resin in a mixture of its resin and carbon particles by ion-exchange reaction between a counter ion of the resin and the cation, and a second step of chemically reducing the cations in the mixture obtained at the first step, and a third step of absorbing a cation of a catalyst metal element (Y') into the resin by ion-exchange reaction between the counter ion and the cation, and a forth step of chemically reducing the cation in the mixture obtained at the third step, wherein the element (Y') is different from the element (X').

In the solid polymer electrolyte-catalyst composite electrode for fuel cell obtained by the production process of the invention, the catalyst metal is preferentially supported on the site where the surface of carbon particles contacts the proton-conductive passage in the cation-exchange resin. Thus, the amount of catalyst metal supported on the site accounts for 50 wt % or more of the total supported amount of catalyst metal.

DETAILED DESCRIPTION OF THE INVENTION

Detailed description of the invention will be described as follows referring to the accompanying drawings.

The catalyst metal according to the present invention has been worked out paying attention to an arrangement such that an electrode for fuel cell is made of a solid polymer electrolyte-catalyst composite electrode containing a cation-exchange resin, carbon particles and a catalyst metal, wherein the catalyst metal is loaded mainly on the site where the surface of the carbon particles contacts the proton-conductive passage in the cation-exchange resin, the amount of the catalyst metal supported on the foregoing site preferably exceeds 50 wt % of the total supported amount of catalyst metal, drastically enhancing the percent utilization of catalyst metal. Further, a catalyst metal having a nucleus made of a metal element (X) and an outer layer made of a metal (Y) is supported on the foregoing site, thereby obtaining an inexpensive high performance electrode for fuel cell.

Figure 1:
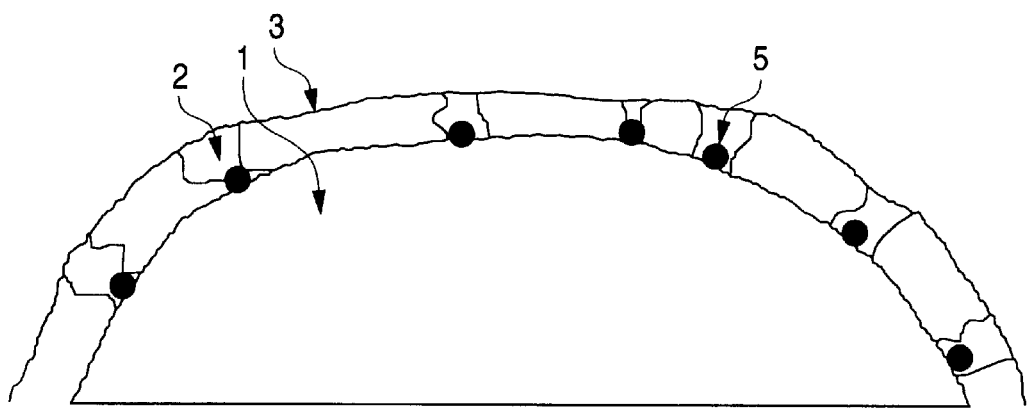
FIG. 1 is a diagram illustrating portion where of a surface of a carbon particle contacts a cation-exchange resin in the electrode of the invention.

The structure of the electrode of the invention will be described hereinafter in connection with the accompanying drawings. FIG. 1 is a diagram illustrating the portion where of the surface of a carbon particle contacts the cation-exchange resin in the electrode of the invention. In FIG. 1, the reference numeral 1 indicates carbon particle, the reference numeral 2 indicates the proton-conductive passage the cation-exchange resin, the reference numeral 3 indicates the Teflon backbone of the cation-exchange resin, and the reference numeral 5 indicates a catalyst metal particle.

The electrode of the invention is a porous electrode made of a cation-exchange resin, carbon particles and a catalyst metal. The electrode of the invention has an electron-conductive channel formed by the carbon particles, a proton-conductive channel formed by the cation-exchange resin, and a channel with the large number of pages for the supply of active materials and discharge of products. For example, as shown in FIG. 1, the electrode of the invention has a structure such that the surface of the carbon particle 1 is coated with a cation-exchange resin made of a proton-conductive passage 2 and a Teflon backbone, 3 and catalyst metal particles 5 are supported on the site where the surface of the carbon particle 1 contacts the proton-conductive passage 2 in the cation-exchange resin.

Figure 11:
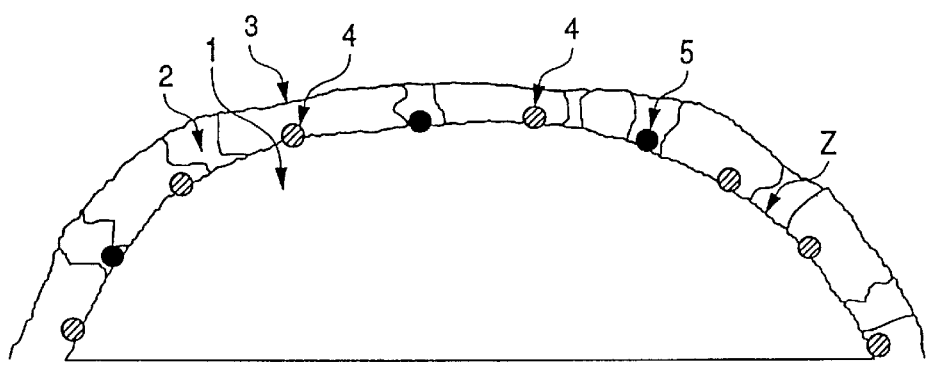
FIG. 11 is diagram illustrating portion where the surface of a carbon particle contacts the cation-exchange resin in the conventional electrode.

In accordance with the invention, as mentioned above, when the amount of the catalyst metal supported on the three-phase boundary formed on the site where the surface of carbon particle contacts the proton-conductive passage in the cation-exchange resin exceeds 50% by weight of the total supported amount of catalyst metal, the percent utilization of catalyst metal is more enhanced. In the present invention, the proportion of the amount of the catalyst metal supported on the three-phase boundary formed on the site where the surface of carbon particle contacts the proton-conductive passage in the cation-exchange resin in the total supported amount of catalyst metal is preferably as high as possible, particularly more than 80% by weight. By thus carrying the catalyst metal on the site where the surface of carbon particle contacts the proton-conductive passage at a high ratio, the region Z shown in FIG. 11 (region which has a three-phase boundary formed therein but is free of catalyst metal particles and thus has no catalyst metal particles supported thereon, taking no part in the reaction) is reduced, enhancing the activity of the electrode.

Further, in accordance with the invention, as mentioned above, the catalyst metal is supported preferentially on the site where the surface of the carbon particle contacts the proton-conductive passage, i.e., three-phase boundary, though a carbon particle have a great surface area has a structure, a catalyst metal having a nucleus containing a metal (X) and an shell containing a metal (Y) which is not contained in the nucleus is supported only on the limited site in the minimum required amount. In this arrangement, therefore, the percent utilization of catalyst metal can be enhanced, and the catalyst metal cannot be independently dispersed in the slightest amount to lower the percent alloying, the original alloy properties can be sufficiently attained.

Further, as reported in studies made by T. D. Gierke et al. (J. Membrane Sci., 13, 307 (1983)), the diameter of cluster which is a proton-conductive passage in a cation-exchange resin was turned out to be about 40 angstrom. Considering above mentioned-the effect of this invention together, when the average size of the catalyst metal to be supported on the foregoing boundary site is 40 angstrom or less, the diffusion of water or gas cannot be prevented but can.be supported out efficiently to advantage.

Further, a catalyst metal shows a great activity when it has a proper size. It is reported in studies made by K. Kinoshita et al. (J. Electrochem. Soc., 137, 845 (1990)) that the particle diameter of platinum at which a strong activity is shown against the reduction reaction of oxygen is from about 7 to 40 angstrom. Therefore, considering the micro-construction of this invention together, the average size of the catalyst metal to be used in the invention was turned out to be preferably from 7 to 40 angstrom.

The electrode for fuel cell made of a solid polymer electrolyte-catalyst composite electrode containing a cation-exchange resin, carbon particles and a catalyst metal, the catalyst metal being supported mainly on the site where the surface of the carbon particles contacts the proton-conductive passage in the cation-exchange resin, will be further described hereinafter.

Referring to the kind of the catalyst metal to be incorporated in the electrode of the invention, one having a high catalytic activity against the electrochemical reduction reaction of oxygen or oxidation reaction of hydrogen. A metal belonging to the platinum group such as platinum, rhodium, ruthenium, iridium, palladium and osmium or alloy thereof is preferably used. As the cation-exchange resin there is preferably used a perfluorocarbonsulfonic acid type or styrene-divinylbenzene-based sulfonic acid type cation-exchange resin. As the carbon particle there is preferably used carbon black, which shows a high activity against the reduction reaction of cations containing a catalyst metal element. For example, acetylene black or kitchen black such as Denka Black, Vulcan XC-72 and Black Pearl 2000 is particularly preferred.

The electrode for fuel cell of the invention having the foregoing structure can be produced by a process for the production of an electrode for fuel cell of the invention comprising a first step of absorbing a cation containing a catalyst metal element into a cation-exchange resin in a mixture containing its resign and carbon particles by ion-exchange reaction between a counter ion of the resin and the cations, and a second step of chemically reducing the cations in the mixture obtained at the first step.

In the production process of the invention, the execution of the first and second steps can be followed by the repetition of the first and second steps once or more times so that the catalyst metal can grow further with the catalyst metal which has been initially supported as a nucleus. Further, the catalyst metal can be supported in an arbitrary size. Accordingly, in the present invention, by considering the repeated number of the first and second steps, an electrode for fuel cell made of a high activity catalyst metal having a size of from 7 to 40 angstrom supported thereon can be prepared.

The foregoing production process of the invention has been worked out paying attention to the fact that the ion-exchange reaction between counter ions of a cation-exchange resin and cations of a catalyst metal element makes it possible to cause the cations to be adsorbed preferentially to the proton-conductive passage in the cation-exchange resin, the reduction of the adsorbed cations of a catalyst metal element makes it possible to produce a catalyst metal by carbon particles showing a catalytic activity for the reduction reaction of the cations of a catalyst metal element. Thus, the production process of the invention is not limited to the electrode of the invention but can be used to produce electrodes for fuel cell having other structures.

The cation of a catalyst metal element to be used in the production process of the invention is a cation which can be reduced to the catalyst metal. The catalyst metal is not specifically limited in its shape or other properties so far as it can acts as a catalyst. In practice, however, as the cation of a catalyst metal element there may be used, e g., one which can be reduced to produce a catalyst metal particle.

The kind of the cation of a catalyst metal element has a great effect on its adsorption characteristics. The cation of a catalyst metal element to be used in the invention preferably can hardly be adsorbed to the portion where the surface of carbon particles is not coated with a cation-exchange resin but is adsorbed preferentially to the proton-conductive passage in the cation-exchange resin by ion-exchange reaction with the counter ions of the cation-exchange resin. A preferred example of the cation of a catalyst metal element of the invention is a complex ion of metal belonging to the platinum group having such adsorption characteristics, particularly an ammine complex ion which can be presented by $[Pt(NH_3)_4]^{2+}$, $[Pt(NH_3)_6]^{4+}$, $[Ru(NH_3)_6]^{2+}$, $[Ru(NH_3)_6]^{3+}$ or the like. The mixture containing carbon particles and a cation-exchange resin is solid and is preferably prepared, e.g., in the form of porous material having a cation-exchange resin and carbon particles, optionally PTFE particles, dispersed therein. In particular, the mixture is preferably in the form of porous film having a cation-exchange resin and carbon particles uniformly dispersed therein. The thickness of the porous film is preferably from 3 $\mu$m to 30 $\mu$m, more preferably from 3 $\mu$m to 20 $\mu$m.

The foregoing mixture of a cation-exchange resin and carbon particles is preferably prepared by a process including making a film (preferably to a thickness of from 3 $\mu$m to 30 $\mu$m) of a paste obtained by mixing carbon particles, a cation-exchange resin solution, and optionally a dispersion of PTFE particles on a polymer film, and then drying the film of the paste, or the mixture is also prepared by a process including making a film (preferably to a thickness of from 3 $\mu$m to 30 $\mu$m) of a paste made of carbon particles and a suspension of PTFE particles on a polymer film, drying the film, applying a cation-exchange resin solution to the film of the paste so that the film is impregnated with the cation-exchange resin solution, and then drying the film, or a process which includes applying a paste obtained by mixing carbon particles, a cation-exchange resin solution and optionally a dispersion of PTFE to the substrate made of an electrically-conductive porous material, such as carbon, and then drying the substrate, or a process which includes applying a paste made of carbon particles and a dispersion of PTFE particles to the substrate made of an electrically-conductive porous material, such as carbon, heating and drying the substrate, applying a cation-exchange resin solution to the substrate so that the substrate is impregnated with the cation-exchange resin solution, and then drying the substrate. The foregoing various pastes preferably comprise the foregoing components dispersed therein in a sufficiently uniform manner to obtain a mixture in the form of porous film having a cation-exchange resin and carbon particles uniformly dispersed therein.

Alternatively, a form having a mixture containing carbon particles and a cation-exchange resin connected to an ion-exchange membrane on either or both sides thereof is preferably used.

As the cation-exchange resin solution there is preferably used a solution of a cation-exchange resin such as perfluorocarbonsulfonic acid type or styrene divinylbenzene-based sulfonic acid type cation-exchange resin in an organic solvent optionally mixed with water.

The first step of absorbing a cation of a catalyst metal element into a cation-exchange resin in a mixture containing its resin and carbon particles by ion-exchanging reaction between a counter ion of the resin can be carried out by, e.g., dissolving in water or an aqueous solution of alcohol a catalyst metal compound which produces cations containing a catalyst metal element in an aqueous solution or a solution containing an alcohol, and then soaking a mixture composed of a cation-exchange resin and carbon particles in its aqueous solution containing the catalyst metal compound.

In the case where a catalyst metal compound which produces cations containing a catalyst metal element in an aqueous solution or a solution containing an alcohol is used, a mixed solution of several such catalyst metal compounds may be used. For example, when an aqueous solution of a platinum compound and a ruthenium compound is used, cations containing platinum and cations containing ruthenium can undergo ion-exchange reaction with counter ions of the cation-exchange resin at the adsorption step so that they are simultaneously adsorbed to the proton-conductive passage in the cation-exchange resin, making it possible to expect that a platinum-ruthenium alloy at the subsequent reduction step.

The a catalyst metal compound, to be used at the foregoing adsorption step, which produces cations containing a catalyst metal element in an aqueous solution or a solution containing an alcohol is preferably such that the resulting cations containing a catalyst metal element can hardly be adsorbed to the portion where the surface of carbon particles is not coated with a cation-exchange resin but is adsorbed preferentially to the proton-conductive passage in the cation-exchange resin when it undergoes ion-exchange reaction with the counter ions of the cation-exchange resin. For example, an ammine complex which can be represented by $[Pt(NH_3)_4]X_2$, $[Pt(NH_3)_6]X_4$, $[Ru(NH_3)_6]X_2$ or $[Ru(NH_3)_6]X_3$ (in which X is a monovalent anion). X is preferably chlorine. Preferred among these ammine complexes are divalent ammine complexes of platinum. Particularly preferred among these divalent ammine complexes of platinum is tetrammineplatinum (II) chloride ($[Pt(NH_3)_4]Cl_2 \cdot nH_2O$).

It is known that cations of a catalyst metal element which have been adsorbed to the proton-conductive passage by ion-exchange reaction cannot be easily separated from the proton-conductive passage even when washed with water. On the other hand, extra catalyst metal compound which has been attached to the interior or the pores can be easily removed when washed with water. By making the use of these characteristics to thoroughly wash the mixture, composed of carbon particles and a cation-exchange resin, having cations of a catalyst metal element by adsorbing process before the reduction step, extra catalyst metal compound which has been attached to the interior of the pores, etc. can be selectively removed to advantage.

In order to carry out the step of allowing the mixture of a cation-exchange resin and carbon particles thus prepared to undergo ion-exchange reaction of counter ions around the cation-exchange resin with cations containing a catalyst metal element to allow the cations containing a catalyst metal element to be adsorbed to the cation-exchange resin, and then chemically reducing the cations containing a catalyst metal element in the mixture, a chemical reduction method using a reducing agent suitable for mass production is preferably used. In particular, a method involving gas phase reduction with hydrogen gas or hydrogen-containing gas or a method involving gas phase reduction with an inert gas containing hydrazine is preferred.

In the second step of chemically reducing the cations containing a catalyst metal element in the mixture, when the reduction is effected at a temperature lower than the temperature at which the cations existing in the simple body of cation-exchange resin can be reduced, the cations of a catalyst metal element existing near the surface of carbon particles are reduced in preference to the cations of a catalyst metal element existing only in the cation-exchange resin because the carbon particles show a catalytic activity for the reduction reaction of the cations.

Thus, it is preferred that the kind of the reducing agent to be used, the reduction pressure, the concentration of the reducing agent, the reduction time and the reduction temperature be properly adjusted so that the cations containing a catalyst metal element existing near the surface of the carbon particles are reduced in preference to the cations. In some detail, it is preferred that the reduction be effected at a temperature lower than the temperature at which the cations of a catalyst metal element existing in the simple body of cation-exchange resin can be reduced so that the amount of catalyst metal supported on the site where the surface of the carbon particles contacts the proton-conductive passage in the cation-exchange resin exceeds 50 wt % of the total supported amount of catalyst metal.

For example, by reducing hydrogen as a reducing agent and adjusting the reduction temperature, the cations of a catalyst metal element existing on the surface of the carbon particles can be reduced in preference to the cations of a catalyst in the cation-exchange resin, making it possible to produce the catalyst metal mainly on the site where of the carbon particles contacts proton-conductive passage in the solid polymer electrolyte.

The temperature at which the platinum ammine complex ion $[Pt(NH_3)_4]^{2+}$ adsorbed into the perfluorocarbonsulfonic acid type cation-exchange resin is reduced with hydrogen is about 300° C. (Tetsuo Sakai, "Quarterly Report of Osaka Kogyo Shikenjo (Osaka Laboratory of Industrial Technology)", 36, 10, 1985). On the other hand it is reported that the temperature at which $[Pt(NH_3)_4]^{2+}$ adsorbed to the surface of carbon particles having modified exchange groups (Denka Black, Vulcan XC-72, Black Pearl 2000, etc.) can be reduced at a temperature of only 180° C. (K. Amine, M. Mizuhata, K. Oguro, H. Takenaka, "J. Chem. Soc. Faraday Trans," 91, 4451, 1995).

In other words, an electrode for fuel cell made of a solid polymer electrolyte-catalyst composite electrode containing a cation-exchange resin, carbon particles and a catalyst metal, wherein the amount of the catalyst metal (for example, platinum) supported on the site where the surface of the carbon particles contacts the proton-conductive passage in the cation-exchange resin exceeds 50 wt % of the total supported amount of catalyst metal, can be prepared by a process including soaking a mixture composed of Vulcan XC-72 as carbon particle and a cation-exchange resin in an aqueous solution of $[Pt(NH_3)_4]Cl_2$ as catalyst material compound to cause ion-exchange reaction between $[Pt(NH_3)_4]Cl_2$ and the counter ions($H^+$) of the cation-exchange resin so that $[Pt(NH_3)_4]^{2+}$ is adsorbed to the proton-conductive passage in the cation-exchange resin, and then reducing the mixture with hydrogen gas at a temperature of 180° C.

The cation ($[Pt(NH_3)_4]^{2+}$) of a catalyst metal element left unreduced in the electrode can be removed and recovered by soaking the electrode in an acidic aqueous solution such as diluted sulfuric acid after the reduction step.

By thus selecting a combination of a cation containing a proper catalyst metal element and carbon particles and controlling the temperature of reduction with, e.g., hydrogen, an electrode for fuel cell made of a solid polymer electrolyte-catalyst composite electrode containing a cation-exchange resin, carbon particles and a catalyst metal, wherein the amount of the catalyst metal supported on the site where the surface of the carbon particles contacts the proton-conductive passage in the cation-exchange resin exceeds 50 wt % of the total supported amount of catalyst metal, can be prepared.

The temperature of reduction with hydrogen is preferably lower than the decomposition temperature of the cation-exchange resin, more preferably lower than the glass transition temperature of the cation-exchange resin, to prevent the degradation of the cation-exchange resin. Accordingly, the selection of carbon particles and a raw material of catalyst is preferably made such that the temperature of reduction of the raw material of catalyst with hydrogen is lower than the decomposition temperature or glass transition temperature of the solid polymer electrolyte. The solid polymer electrolyte to be normally incorporated in electrodes for fuel cell is a perfluorocarbonsulfonic acid type having a decomposition temperature of 280° C. By reducing at a temperature lower than the decomposition temperature of the solid polymer electrolyte, the degradation of the ion-exchange resin in the electrode can be inhibited. It is particularly preferred that the reduction temperature be 200° C. or lower to minimize the degradation of the ion-exchange resin. As the gas to be used at the reduction step there may be used a hydrogen-containing gas mixed with gases other than hydrogen besides hydrogen.

However, the temperature at which the reduction reaction of the cation containing a catalyst metal element adsorbed to the mixture composed of a cation-exchange resin and carbon particles with hydrogen gas proceeds is normally not lower than 180° C. to 200° C. Further, it takes much time to terminate the reduction reaction. The inventors found that by pressing hydrogen or the mixture gas containing hydrogen, preferably to a pressure of 1.5 atm or higher, the reduction with hydrogen can be effected at a lowered temperature and terminated in a short period of time.

Therefore, the process for the production of the electrode for fuel cell according to the invention includes allowing the cation-exchange resin in the mixture composed of cation-exchange resin and carbon particles to undergo ion-exchange reaction between counter ions of the cation-exchange resin and cations containing a catalyst metal element to cause the cations to be adsorbed to the cation-exchange resin (adsorption step) and reducing the cations with hydrogen or a mixed gas containing hydrogen (reduction step).

The temperature at which the reduction reaction of the cations containing a catalyst metal element adsorbed to the cation-exchange resin in the mixture composed of a cation-exchange resin and carbon particles with hydrogen gas proceeds depends greatly on the hydrogen partial pressure. When the pressure of hydrogen or the mixed gas containing hydrogen is raised, the cations containing a catalyst metal element can be reduced at a lowered temperature and terminated in a reduced period of time. Therefore, the pressure of hydrogen or the mixed gas containing hydrogen is preferably as high as possible. In particular, the pressure is preferably 1.5 atm or higher, more preferably 5 atm or higher, particularly 9 atm or higher to make its effect remarkable.

The pressure of hydrogen gas may be further raised by heating the atmosphere, compressed hydrogen or mixed gas containing hydrogen sealed in an airtight reaction vessel to a desired temperature. Alternatively, heating of the gas to a desired temperature in the atmosphere may be followed by sealing a compressed gas in the reaction vessel or keeping the compressed gas to flow into the reaction vessel.

As the gas to be used at the reduction step there may be used a hydrogen-containing gas mixed with gases other than hydrogen besides hydrogen. The raw material of metal which has be left unreduced in the cation-exchange resin can be extracted from the electrode by soaking the electrode which has been reduced with hydrogen in an acidic aqueous solution such as diluted sulfuric acid or diluted hydrochloric acid. By washing the electrode thus treated with water, the acidic aqueous solution left behind in the electrode can be removed away.

The electrode for fuel cell of the invention made of a solid polymer electrolyte-catalyst composite electrode containing a cation-exchange resin, carbon particles and a catalyst metal, the catalyst metal being supported mainly on the site where the surface of the carbon particles contacts the proton-conductive passage in the cation-exchange resin, wherein the catalyst metal includes a nucleus containing a metal (X) and a shell containing a metal (Y) which is not contained in the nucleus, will be further described hereinafter.

In accordance with the present invention, a catalyst metal is supported preferentially on the site where the surface of carbon particles contacts the proton-conductive passage, i.e., three-phase boundary from microscopic consideration as mentioned above. Therefore, even if the carbon particles have a great surface area, a structure can be formed having a required minimum amount of catalyst metal having a nucleus containing a metal (X) and an outer layer containing a metal (Y) which is not contained in the nucleus supported only on three-phase boundary site formed on the carbon particles, enhancing the percent utilization of catalyst metal. Accordingly, the catalyst metal cannot be independently dispersed in the slightest amount to lower the percent alloying. Therefore, activity which cannot be obtained by the single use of a platinum group metal element, i.e., CO resistance can be obtained by the use of an extremely small amount of catalyst metal.

The foregoing electrode for fuel cell of the invention can be produced, e.g., by the process for the production of an electrode for fuel cell of the invention which includes comprising, a first step of absorbing a cation of a catalyst metal element (X') into a cation-exchange resin in a mixture containing its resin and carbon particles by ion-exchange reaction between a counter ion of the resin and the cation, and a second step of chemically reducing the cations in the mixture obtained at the first step, and a third step of absorbing a cation of a catalyst metal element (Y') into the resin by ion-exchange reaction between the counter ion and the cation, and a forth step of chemically reducing the cation in the mixture obtained at the third step, wherein the element (Y') is different from the element (X').

The cation containing a metal element (X') to be used in the production process of the invention is a cation which can be reduced to a metal (X). The cation containing a metal element (X') to be used in the invention preferably can hardly be adsorbed to the portion where the surface of carbon particles is not coated with a cation-exchange resin but is adsorbed preferentially to the proton-conductive passage in the cation-exchange resin when it undergoes ion-exchange reaction with the counter ions around the cation-exchange resin. The cation of a metal element (Y') is a cation which can be reduced to a metal (Y) which can act as a catalyst.

In the production process of the invention, the execution of the first and second steps can be followed by the repetition of these steps once or more times so that the catalyst metal can grow further with the catalyst metal which has been initially supported as a nucleus, making it possible to arbitrarily control the particle diameter of the metal (X) as a nucleus. Further, the execution of the third and fourth steps can be followed by the repetition of third and fourth steps one or more times so that the thickness of the shell made of the metal (Y) can be controlled.

The foregoing production process of the invention has been worked out paying attention to the fact that the ion-exchange reaction between counter ions of a cation-exchange resin and cations of a metal element (X') makes it possible to cause the cations to be adsorbed preferentially to the proton-conductive passage in the cation-exchange resin, the reduction of the adsorbed cations containing a metal element (X') makes it possible to produce a metal (X), the ion-exchange reaction between counter ions of a cation-exchange resin and cations of a metal element (Y') makes it possible to cause the cations to be adsorbed preferentially to the proton-conductive passage in the cation-exchange resin, the reduction of the adsorbed cations containing a metal element (Y') makes it possible to produce a metal (Y), the reduction of the cations to which the cations have been adsorbed makes it possible to produce a metal (Y), carbon particles show a catalytic activity against the reduction reaction of the cations of a metal element (X') or a metal element (Y') and the chemical reduction reaction of the cations of a metal element (X') or metal element (Y') at the second step which is effected for the second time or subsequently or the fourth step which is effected for the first time or subsequently proceeds with the metal (X) or (Y) which has been originally supported as a nucleus. Therefore, the foregoing production process of the invention is very suitable for the production of the electrode for fuel cell of the invention made of a catalyst metal being supported mainly on the site where the surface of carbon particles contacts the proton-conductive passage in a cation-exchange resin wherein the catalyst metal includes a nucleus containing a metal (X) and an shell containing a metal (Y) which is not contained in the nucleus. However, the foregoing production process of the invention is not limited to the foregoing electrode of the invention but can be used to produce electrodes for fuel cell having other structures.

The kind of the cation of a metal element (X' or Y') has a great effect on its adsorption characteristics. The cation of a metal element (X' or Y') to be used in the invention preferably can hardly be adsorbed to the portion where the surface of carbon particles is not coated with a cation-exchange resin but is adsorbed preferentially to the proton-conductive passage in the cation-exchange resin when it undergoes ion-exchange reaction with the counter ions of the its resin. In particular, if an expensive platinum group metal is used, a metal complex ion having such adsorption characteristics, particularly an ammine complex ion of platinum group metal which can be represented by $[M(NH_3)_4]^{2+}$, $[M(NH_3)_6]^{4+}$, $[M(NH_3)_6]^{2+}$, $[M(NH_3)_6]^{3+}$ or the like (in which M is a platinum group metal), particularly complex ion of platinum group metal such as $[Pt(NH_3)_4]^{2+}$, $[Pt(NH_3)_6]^{4+}$, $[Ru(NH_3)_6]^{2+}$ and $[Ru(NH_3)_6]^{3+}$, is preferred.

The first step of absorbing a cation of a catalyst metal element (X') into a cation-exchange resin in a mixture containing its resin and carbon particles by ion-exchange reaction between a counter ion of the resin and the cation can be carried out by, e.g., dissolving in water or an aqueous solution of alcohol a metal element (X') compound which produces cations containing a metal element (X') in an aqueous solution or a solution containing an alcohol, and then soaked a mixture composed of a cation-exchange resin and carbon particles in the aqueous solution containing the metal element (X') compound.

Similarly, the third step of absorbing a cation of a catalyst metal element (Y') into the resin in a mixture containing its resin and carbon particles by ion-exchange reaction between the counter ion and the cation can be carried out by, e.g., dissolving in water or an aqueous solution of alcohol a metal compound which produces cations of a metal element (Y') in an aqueous solution or a solution containing an alcohol, and then soaking a mixture composed of a cation-exchange resin and carbon particles in the aqueous solution containing the metal element (Y') compound.

In the case where a metal compound which produces cations containing a metal element (Y') in an aqueous solution or a solution containing an alcohol is used, a mixed solution of a mixture of several such catalyst metal compounds may be used. For example, when an aqueous solution of a platinum compound and a ruthenium compound is used, cations of platinum and cations of ruthenium can undergo ion-exchange reaction with counter ions of the cation-exchange resin at the adsorption step so that they are simultaneously adsorbed to the proton-conductive passage in the cation-exchange resin, making it possible to expect that a platinum-ruthenium alloy at the subsequent reduction step. This applies to the formation of nucleus of catalyst metal.

Especially, in the case where as the metal compound which produces cations containing a metal element belonging to the platinum group in an aqueous solution or a solution containing an alcohol to be used at the adsorption step there is used an expensive platinum group metal compound, the resulting cations containing a platinum group metal element preferably can hardly be adsorbed to the portion where the surface of carbon particles is not coated with a cation-exchange resin but is adsorbed preferentially to the proton-conductive passage in the cation-exchange resin when it undergoes ion-exchange reaction with the counter ions its resin. A preferred example of such a platinum group metal compound is a metal complex, particularly an ammine complex which can be represented by $[M(NH_3)_4]Q_2$, $[M(NH_3)_6]Q_2$, $[M(NH_3)_6]Q_3$, $[M(NH_3)_6]Q_4$ or the like (in which M is a metal, and Q is a monovalent anion). Q is preferably chlorine. Preferred among these metal complexes are ammine complexes represented by $[Pt(NH_3)_4]X_2$, $[Pt(NH_3)_6]X_4$, $[Ru(NH_3)_6]X_2$, $[Ru(NH_3)_6]X_3$ or the like (in which X is a monovalent anion). X is preferably chlorine. In particular, a divalent ammine complex of platinum, particularly tetrammineplatinum (II) chloride ($[Pt(NH_3)_4]Cl_2 \cdot nH_2O$) is preferred.

It is known that cations of a catalyst metal element which have been adsorbed to the proton-conductive passage by ion-exchange reaction cannot be easily separated from the proton-conductive passage even when washed with water. On the other hand, extra metal compound which has been attached to the interior or the pores can be easily removed when washed with water. By making the use of these characteristics to thoroughly wash the mixture, composed of carbon particles and a cation-exchange resin, having cations containing a catalyst metal element adsorbed before the reduction step, extra metal compound which has been attached to the interior of the pores, etc. can be selectively removed to advantage.

As the cation-exchange resin, carbon particles and mixture of carbon particles and a cation-exchange resin to be used in the invention there may be used those described in detail with reference to the solid polymer electrolyte-catalyst composite electrode containing a cation-exchange resin, carbon particles and a catalyst metal, the catalyst metal being supported mainly on the site where the surface of the carbon particles contacts the proton-conductive passage in the cation-exchange resin.

In order to carry out the second or fourth step of allowing the mixture of a cation-exchange resin and carbon particles thus prepared to undergo ion-exchange reaction between counter ions of the cation-exchange resin and cations of a metal element (X') or a metal element (Y') to allow the cations of a metal element (X') or a metal element (Y') to be adsorbed to the cation-exchange resin, and then chemically reducing (second or fourth steps) the cations of a metal element (X') or a metal element (Y') in the mixture, a chemical reduction method using a reducing agent suitable for mass production is preferably used. In particular, a method involving gas phase reduction with hydrogen gas or hydrogen-containing gas or a method involving gas phase reduction with an inert gas containing hydrazine is preferred.

During the reduction process, the carbon particles show a catalytic activity for the reduction reaction of the cations of a metal element (X') or a metal element (Y'), whereby the cations of a metal element (X') or a metal element (Y') existing near the surface of carbon particles are reduced in preference to the cations of a metal element (X') or a metal element (Y') in the cation-exchange resin.

By thus selecting a combination of a cation containing a proper metal element (X') or a metal element (Y') and carbon particles and controlling the temperature of reduction with, e.g., hydrogen, an electrode for fuel cell made of a solid polymer electrolyte-catalyst composite electrode containing a cation-exchange resin, carbon particles and a catalyst metal, wherein the amount of the platinum supported on the site where the surface of the carbon particles contacts the proton-conductive passage in the cation-exchange resin exceeds 50 wt % of the total supported amount of catalyst metal, can be prepared.

The temperature of reduction with hydrogen is preferably lower than the decomposition temperature of the cation-exchange resin, more preferably lower than the glass transition temperature of the cation-exchange resin, to prevent the degradation of the cation-exchange resin. Accordingly, the selection of carbon particles and the cation of a metal element (X') or a metal element (Y') is preferably made such that the temperature of reduction of the cation of a metal element (X') or a metal element (Y') with hydrogen is lower than the decomposition temperature or glass transition temperature of the cation-exchange resin.

The cation-exchange resin which is normally incorporated in an electrode for fuel cell is of a perfluorocarbon-sulfonic acid type having a decomposition temperature of 280° C. By reducing at a temperature lower than the decomposition temperature, the degradation of the cation-exchange resin in the electrode can be inhibited. In particular, the reduction temperature is preferably 200° C. or lower to minimize the degradation of the ion-exchange resin to advantage. As the gas to be used at the reduction step there may be used a hydrogen-containing gas mixed with gases other than hydrogen besides hydrogen.

However, the temperature at which the reduction reaction of the cation containing a catalyst metal element adsorbed to the mixture of a cation-exchange resin and carbon particles with hydrogen gas proceeds is normally not lower than 180° C. to 200° C. Further, it takes much time to terminate the reduction reaction. The inventors found that by pressing hydrogen or the mixture gas containing hydrogen, preferably to a pressure of 1.5 atm or higher, the reduction with hydrogen can be effected at a lowered temperature and terminated in a short period of time.

The temperature at which the reduction reaction of the cations containing a catalyst metal element (X' or Y') adsorbed to the cation-exchange resin in the mixture composed of a cation-exchange resin and carbon particles with hydrogen gas proceeds depends greatly on the: hydrogen partial pressure. When the pressure of hydrogen or the mixed gas containing hydrogen is raised, the cations containing a catalyst metal element can be reduced at a lowered temperature and terminated in a reduced period of time. Therefore, the pressure of hydrogen or the mixed gas containing hydrogen is preferably as high as possible. In particular, the pressure is preferably 1.5 atm or higher, more preferably 5 atm or higher, particularly 9 atm or higher to make its effect remarkable.

The pressure of hydrogen gas may be further raised by heating the atmosphere, compressed hydrogen or mixed gas containing hydrogen sealed in an airtight reaction vessel to a desired temperature. Alternatively, heating of the gas to a desired temperature in the atmosphere may be followed by sealing a compressed gas in the reaction vessel or keeping the compressed gas to flow into the reaction vessel.

As the gas to be used at the reduction step there may be used a hydrogen-containing gas mixed with gases other than hydrogen besides hydrogen.

The raw compound material of metal which has be left unreduced in the cation-exchange resin can be extracted from the electrode by soaking the electrode which has been reduced with hydrogen in an acidic aqueous solution such as diluted sulfuric acid or diluted hydrochloric acid. By washing the electrode thus treated with water, the acidic aqueous solution left behind in the electrode can be removed away.

The electrode for fuel cell of the invention made of a solid polymer electrolyte-catalyst composite electrode containing a cation-exchange resin, carbon particles and a catalyst metal, the catalyst metal being supported mainly on the site where the surface of the carbon particles contacts with the proton-conductive passage in the cation-exchange resin wherein the catalyst metal is composed of a nucleus containing a metal (X) and a shell containing a metal (Y) which is not contained in the nucleus, and the metal (X) is one belonging to the group other than the platinum group and the metal (Y) is one belonging to the platinum group, will be further described hereinafter.

The electrode for fuel cell of the invention has been worked out paying attention to the fact that the use of a catalyst metal having a nucleus made of a metal element (X) other than platinum group metal and a shell made of a platinum group metal (Y) provides an inexpensive catalyst having a high catalytic activity per unit supported weight of platinum group metal.

The metal (X) other than platinum group metal to be used as a nucleus of catalyst metal preferably is inexpensive, can be expected to act as a catalyst as well and shows a high activity for the chemical reduction reaction of the cation containing a platinum group metal (Y). As the metal (X) other than platinum group metal, a metal selected from the group consisting of magnesium, aluminum, vanadium, chromium, manganese, iron, cobalt, nickel, copper, zinc, silver and tungsten is particularly preferred because it is inexpensive and can be expected to show a high catalytic activity for the electrochemical reduction reaction of oxygen. As the platinum group metal (Y) of the invention there is preferably used platinum because it shows a high activity for the reduction reaction of oxygen. However, the present invention is not limited to platinum.

As the cation-exchange resin, carbon particles and mixture of carbon particles and a cation-exchange resin to be used in the invention there maybe used those described in detail with reference to the solid polymer electrolyte-catalyst composite electrode containing a cation-exchange resin, carbon particles and a catalyst metal, the catalyst metal being supported mainly on the site where the surface of the carbon particles contacts the proton-conductive passage in the cation-exchange resin.

The production of the foregoing electrode for fuel cell of the invention having a remarkably high catalytic activity per unit weight of platinum group metal and percent utilization of catalyst metal can be accomplished by the production process described with reference to the electrode for fuel cell of the invention made of a catalyst metal being supported mainly on the site where the surface of carbon particles contacts the proton-conductive passage in a cation-exchange resin wherein the catalyst metal is composed of a nucleus containing a metal (X) and a shell containing a metal (Y) which is not contained in the nucleus. As the metal element (X') there is preferably used a metal element other than platinum group metal, more preferably a metal element selected from the group consisting of magnesium, aluminum, vanadium, chromium, manganese, iron, cobalt, nickel, copper, zinc, silver and tungsten. As the metal element (Y') there is used a platinum group element.

The cation of a metal element (X') other than platinum group element to be used in the production process of the invention is a cation which can be reduced to a metal (X) other than platinum group metal. The cation of a metal element (X') other than platinum group metal to be used in the invention preferably can hardly be adsorbed to the portion where the surface of carbon particles is not coated with a cation-exchange resin but is adsorbed preferentially to the proton-conductive passage in the cation-exchange resin by ion-exchange reaction with the counter ions of the cation-exchange resin.

The cation of a platinum group metal element (Y') to be used in the production process of the invention is a cation which can be reduced to a metal (Y) which can act as a catalyst. The form of the cation containing a catalyst metal element has a great effect on its adsorption characteristics. The cation containing a metal element (X' or Y') to be used in the invention preferably can hardly be adsorbed to the surface of carbon particles which are not coated with a cation-exchange resin but is adsorbed preferentially to the proton-conductive passage in the cation-exchange resin when it undergoes ion-exchange reaction with the counter ions of the cation-exchange resin. In particular, for expensive platinum group element (Y'), a metal complex ion having such adsorption characteristics, particularly an ammine complex ion of platinum group metal which can be represented by $[M(NH_3)_4]^{2+}$, $[M(NH_3)_6]^{4+}$, $[M(NH_3)_6]^{2+}$, $[M(NH_3)_6]^{3+}$ or the like (in which M is a platinum group metal), particularly complex ion of platinum group metal such as $[Pt(NH_3)_4]^{2+}$, $[Pt(NH_3)_6]^{4+}$, $[Ru(NH_3)_6]^{2+}$ and $[Ru(NH_3)_6]^{3+}$, is preferred.

The electrode for fuel cell of the invention wherein the catalyst metal having a nucleus containing a metal (X) and a shell containing a metal (Y) which is not contained in the nucleus is supported mainly on the site where the surface of carbon particles contacts with the proton-conductive passage in the cation-exchange resin and both the metal (X) and the metal (Y) are metals selected from the group consisting of platinum, ruthenium, rhodium, palladium and iridium will be further described hereinafter.

The catalyst metal of this invention exhibits high CO resistance or high activity for the electrochemical oxidation reaction of methanol. In this case, the nucleus may be made of platinum, ruthenium, rhodium, palladium and iridium, singly or in admixture or alloy thereof. Regardless of whether the nucleus is made of these metals singly or in admixture or alloy thereof, the resulting effect remains the same. The outer layer may be made of platinum, ruthenium, rhodium, palladium and iridium, singly or in admixture or alloy thereof, so far as it is different from the metal used for the nucleus. Regardless of whether the outer layer is made of these metals singly or in admixture or alloy thereof, the resulting effect remains the same.

As the cation-exchange resin, carbon particles and mixture of carbon particles and a cation-exchange resin to be used in the invention there may be used those described in detail with reference to the solid polymer electrolyte-catalyst composite electrode containing a cation-exchange resin, carbon particles and a catalyst metal, the catalyst metal being supported mainly on the site where the surface of the carbon particles contacts the proton-conductive passage in the cation-exchange resin.

The production of the foregoing electrode for fuel cell of the invention having a remarkably high catalytic activity per unit weight of platinum group metal and percent utilization of catalyst metal can be accomplished by the production process described with reference to the electrode for fuel cell of the invention made of a catalyst metal being supported mainly on the site where the surface of carbon particles contacts the proton-conductive passage in a cation-exchange resin wherein the catalyst metal includes a nucleus containing a metal (X) and an outer layer containing a metal (Y) which is not contained in the nucleus. As the metal element (X') and the metal element (Y') there are preferably used metal elements selected from the group consisting of platinum, ruthenium, rhodium, palladium and iridium. The metal element (X') and the metal element (Y') are selected such that they are different from each other.

The form of the cation has a great effect on its adsorption characteristics. The cation containing a metal element (X' or Y') to be used in the invention preferably can hardly be adsorbed to the surface of carbon particles which are not coated with a cation-exchange resin but is adsorbed preferentially to the proton-conductive passage in the cation-exchange resin when it undergoes ion-exchange reaction with the counter ions around the cation-exchange resin. In particular, if an expensive platinum group metal is used, a metal complex ion having such adsorption characteristics, particularly an ammine complex ion of platinum group metal which can be represented by $[M(NH_3)_4]^{2+}$, $[M(NH_3)_6]^{4+}$, $[M(NH_3)_6]^{2+}$, $[M(NH_3)_6]^{3+}$ or the like (in which M is a platinum group metal), particularly complex ion of platinum group metal such as $[Pt(NH_3)_4]^{2+}$, $[Pt(NH_3)_6]^{4+}$, $[Ru(NH_3)_6]^{2+}$ and $[Ru(NH_3)_6]^{3+}$, is preferred.

The electrode for fuel cell of the invention thus obtained is preferably used as an anode for fuel cell using reformed fuel gas of methanol or DMFC requiring an alloy catalyst in the oxidation reaction of fuel.

EXAMPLES

The present invention will be further described in preferred examples below.

Example 1

A cation-exchange resin (5 wt % solution of Nafion, produced by Aldrich Inc.), carbon particles (Vulcan XC-72) and PTFE particles (Teflon 30J, produced by Mitsui Du Pont Fluorochemical Co., Ltd.) were well mixed to make a paste. The paste thus obtained was applied to an electrically-conductive porous carbon substrate (thickness: 0.5 mm) with hydrophobicity, and then dried at a temperature of 120° C. in a nitrogen atmosphere for 1 hour.

Subsequently, the foregoing mixture composed of a cation-exchange resin and carbon particles was soaked in a 50 mmol/l aqueous solution of $[Pt(NH_3)_4]Cl_2$ for 2 days to undergo ion-exchange reaction that causes $[Pt(NH_3)_4]^{2+}$ to be adsorbed preferentially to the proton-conductive passage in the cation-exchange resin. The mixture was thoroughly washed with deionized water, dried, and then reduced by hydrogen of 180° C. at 1 atm for about 4 hours so that platinum was supported preferentially on the site where the surface of the carbon particles contacts the proton-conductive passage in the resin.

Subsequently, the mixture was soaked in a 0.5 mol/l sulfuric acid overnight so that unnecessary $[Pt(NH_3)_4]^{2+}$ which had been left unreduced at the reduction step was extracted to obtain an electrode A of Example. It was confirmed by an analysis that the amount of platinum supported on the electrode A was about 0.04 mg/cm$^2$.

Example 2

A cation-exchange resin (5 wt % solution of Nafion, produced by Aldrich Inc.) and carbon particles (Vulcan XC-72) were well mixed, and then heated and concentrated to make a paste. The paste thus obtained was applied to a polymer (FEP) film to form a film of the paste (thickness: about 13 μm), and then dried at room temperature.

Subsequently, the foregoing mixture of a cation-exchange resin and carbon particles was soaked in a 50 mmol/l aqueous solution of $[Pt(NH_3)_4]Cl_2$ for 2 days to undergo ion-exchange reaction that causes $[Pt(NH_3)_4]^{2+}$ to be adsorbed preferentially to the proton-conductive passage in the cation-exchange resin (adsorption step). The mixture was thoroughly washed with deionaized water, dried, and then reduced by hydrogen of 180° C. at 1 atm for about 4 hours (reduction step) so that platinum was supported preferentially on the site where the surface of the carbon particles contacts the proton-conductive passage in the cation-exchange resin.

The foregoing adsorption step and reduction step were then repeated twice. Subsequently, the mixture was soaked in a 0.5 mol/l sulfuric acid overnight so that unnecessary $[Pt(NH_3)_4]^{2+}$ in the mixture which had been left unreduced at the reduction step was extracted from the mixture, to obtain an electrode B of Example. It was confirmed by chemical analysis that the amount of platinum supported on the electrode B was about 0.04 mg/cm$^2$.

Example 3

A cation-exchange resin (5 wt % solution of Naflon, produced by Aldrich Inc.) and carbon particles (Vulcan XC-72, produced by Tanaka Kikinzoku K.K.) were well mixed to make a paste. The paste thus obtained was applied to an electrically-conductive porous carbon substrate (thickness: 0.5 mm) provided with water repellency, and then dried at a temperature of 80° C. in a nitrogen atmosphere for 1 hour.

Subsequently, the foregoing mixture of a cation-exchange resin and carbon particles was soaked in a 50 mmol/l aqueous solution of $Ni(NO_3)_2$ for 24 hours to undergo ion-exchange reaction that causes $Ni^{2+}$ to be adsorbed preferentially to the proton-conductive passage in the cation-exchange resin (first step). The mixture was thoroughly washed with deionized water, dried, and then reduced by hydrogen of 200° C. at 30 atm for about 6 hours (second step) so that Ni was supported on the site where the surface of the carbon particles contacts with proton-conductive-passage. Subsequently, the first step and second step were repeated once.

Subsequently, the mixture was soaked in an aqueous solution of $[Pt(NH_3)_4]Cl_2$ for 2 days to undergo ion-exchange reaction that causes $[Pt(NH_3)_4]^{2+}$ to be adsorbed to the proton-conductive passage in the cation-exchange resin (third step). The mixture was thoroughly washed with deionized water, dried, and then reduced by hydrogen of 1 atm, 180° C. for about 6 hours (fourth step).

The third step and forth step were repeated twice so that a catalyst metal made of Ni as a nucleus and Pt as a shell was supported preferentially on the site where the surface of the carbon particles contacts the proton-conductive passage in the cation-exchange resin.

Subsequently, the mixture was soaked in a 0.5 mol/l sulfuric acid for 1 hour so that unnecessary $Ni(NO_3)_2$ and $[Pt(NH_3)_4]Cl_2$ were extracted to obtain an electrode C of Example. It was confirmed in an analysis that the amount of platinum supported on the electrode C was about 0.04 mg/cm$^2$.

Comparative Example 1

A paste obtained by well mixed a carbon supporting platinum (10V30E; Vulcan XC-72 having platinum supported thereon in an amount of 30 wt %, produced by Tanaka Kikinzoku K.K.), a cation-exchange resin (5% solution of Nafion, produced by Aldrich Inc.) and PTFE particles (Teflon 30J, produced by Mitsui Du Pont Fluorochemical Co., Ltd.) was applied to an electrically-conductive porous carbon substrate (thickness: 0.5 mm) provided with water repellency, and then dried at a temperature of 120° C. in a nitrogen atmosphere for 1 hour to obtain an electrode D of Comparative Example. The amount of platinum supported on carbon was adjusted during the preparation of the paste such that the amount of platinum in the electrode D reached about 0.1 mg/cm$^2$.

A paste obtained by kneading a carbon-supporting platinum (10V30E; Vulcan XC-72 having platinum supported thereon in an amount of 30 wt %, produced by Tanaka Kikinzoku K.K.) and a cation-exchange resin (5% solution of Nafion, produced by Aldrich Inc.) was applied to an electrically-conductive porous carbon substrate (thickness: 0.5 mm) provided with water repellency, and then dried at a temperature of 120° C. in a nitrogen atmosphere for 1 hour to obtain an electrode E. The amount of platinum supported on carbon was adjusted during the preparation of the paste such that the amount of platinum in the electrode E reached about 0.12 mg/cm$^2$.

The electrodes A, B and C of Example and the electrodes D and E of Comparative Example were then each connected to an ion-exchange membrane Nafion; thickness: about 50 μm; produced by Du Pont Inc.) on both sides by a hot press (140° C.) process to obtain five membrane-electrode assemblies. These assemblies were each incorporated in a single cell holder for fuel cell to obtain cells A, B, C, D and E, respectively. For the membrane-electrode assembly made of the electrode B, an electrically-conductive porous carbon paper provided with water repellency was connected to the outside of the both electrodes a hot press before incorporation in a single cell holder.

Figure 2:
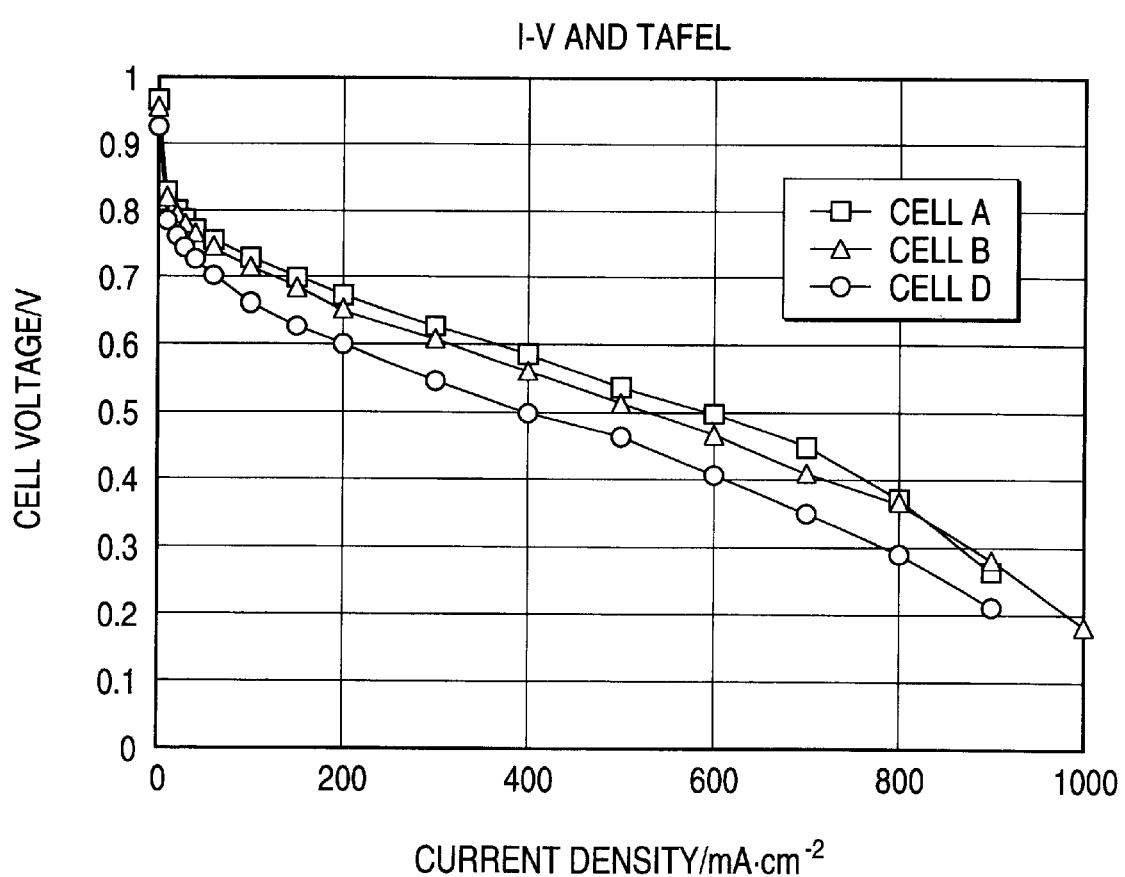
FIG. 2 shows current-voltage characteristics of cells A, B and D.
Figure 3:
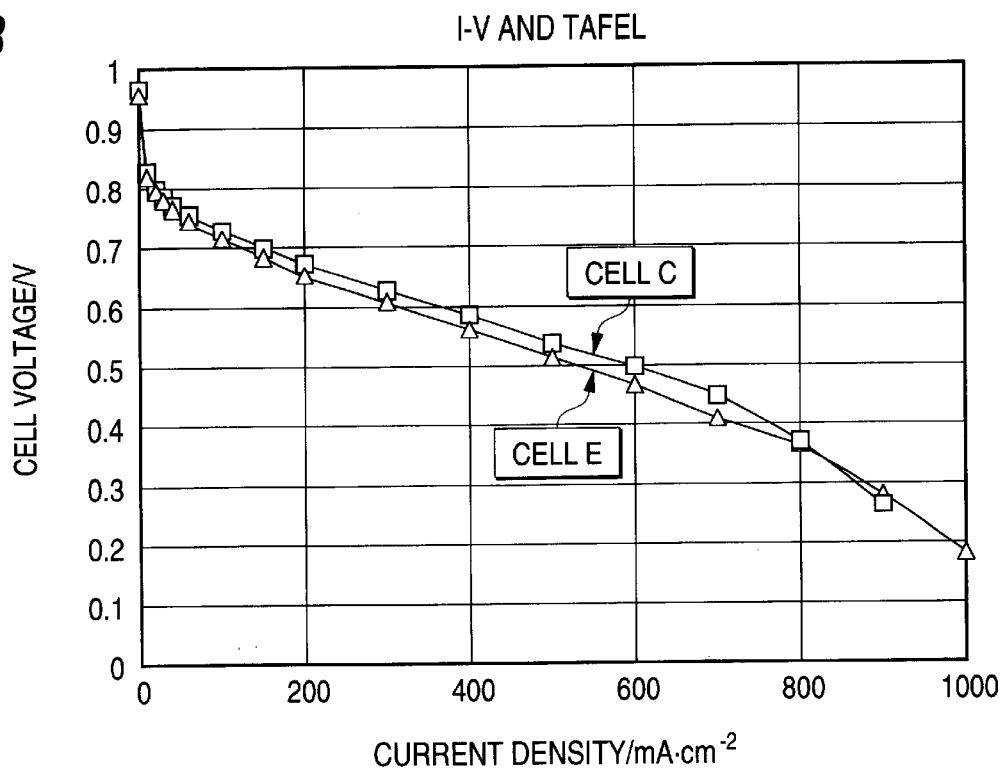
FIG. 3 shows current-voltage characteristics of cells C and E.
Figure 4:
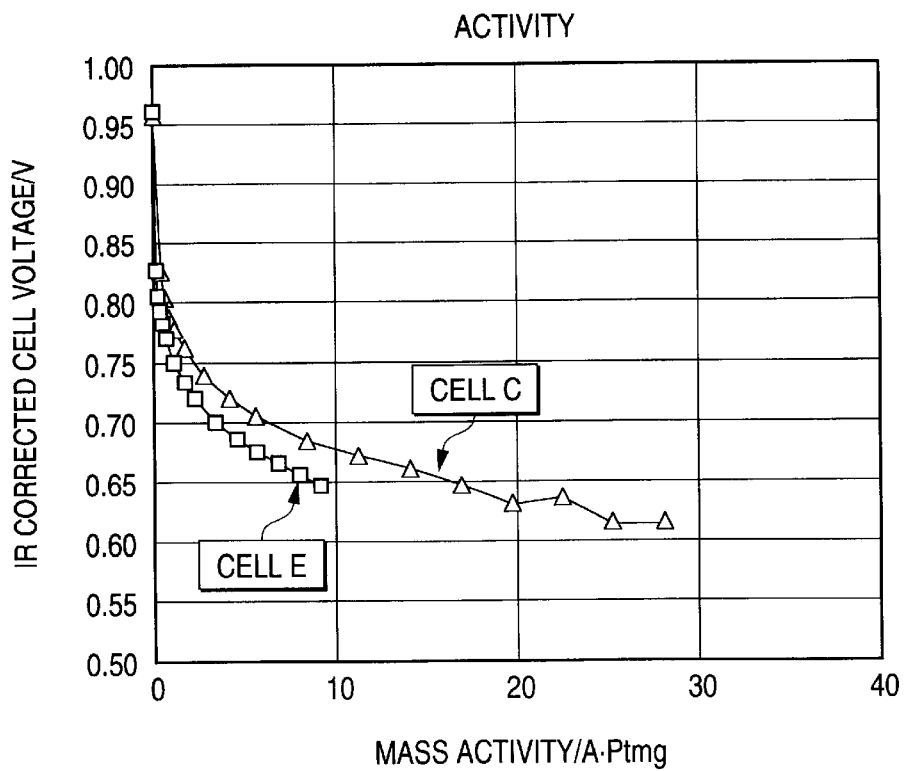
FIG. 4 shows the same current-voltage characteristics as in FIG. 3 except that the abscissa is current density per supported amount of platinum (mass activity)

FIGS. 2 and 3 show the current-voltage characteristics measured when oxygen and hydrogen (2 atm., 80° C.) were supplied to these cells. Further, FIG. 4 shows the same current-voltage characteristics as in FIG. 3 except that the abscissa is current density per supported amount of platinum (mass activity).

As can be seen in FIG. 2, the cells the invention give a high output voltage despite the supported amount of platinum that is half or less the conventional value. This is because the process of the invention allows platinum to be securely loaded on the three-phase boundary site in the electrode to give a remarkably high percent utilization of platinum, making it possible to obtain an electrode having an remarkable high performance even with a small supported amount of platinum.

As can be seen in FIG. 3, the cell C of the invention shows almost the same output characteristics as the conventional cell E despite the supported amount of platinum of cell C that is only about one third of that of the cell E. As can be seen in FIG. 4, the cell C shows a high activity per unit weight of platinum. This is because the cell C has a high percent utilization of catalyst metal and the coating of the nickel nucleus with an shell of platinum allows the nickel nucleus to show the same catalytic activity as platinum particle even thereinside, making it possible to enhance the catalytic activity per unit weight of platinum by the amount of nucleus which is not platinum.

Example 4

A cation-exchange resin solution (5 wt % solution of Nafion, produced by Aldrich Inc.) and carbon particles (Vulcan XC-72, produced by Tanaka Kikinzoku K.K.) were well mixed to make a paste. The paste thus obtained was applied to an electrically-conductive porous carbon substrate (thickness: 0.5 mm) provided with water repellency, and then dried at a temperature of 80° C. in a nitrogen atmosphere for 1 hour.

Subsequently, the foregoing mixture composed of a cation-exchange resin and carbon particles was soaked in a 50 mmol/l aqueous solution of $[Ru(NH_3)_6]Cl_2$ for 24 hours to undergo ion-exchange reaction that causes $[Ru(NH_3)_6]^{2+}$ to be adsorbed preferentially to the proton-conductive passage in the cation-exchange resin (first step). The mixture was thoroughly washed with deionized water, dried, and then reduced by hydrogen of 30 atm at 200° C. for about 6 hours (second step) so that Ru was loaded. Subsequently, the first step and second step were repeated once.

Subsequently, the mixture was soaked in an aqueous solution of $[Pt(NH_3)_4]Cl_2$ for 2 days to undergo ion-exchange reaction that causes $[Pt(NH_3)_4]^{2+}$ to be adsorbed to the proton-conductive passage in the cation-exchange resin (third step). The mixture was thoroughly washed with deionized water, dried, and then reduced by hydrogen of 180° C. at 1 atm for about 6 hours (fourth step). The third step and forth step were repeated twice so that a catalyst metal made of Ru as a nucleus and Pt as a shell was supported mainly on the site where the surface of the carbon particles contacts the proton-conductive passage in the cation-exchange resin.

Subsequently, the mixture was soaked in a 0.5 mol/l sulfuric acid for 1 hour so that unnecessary $[Ru(NH_3)_6]^{2+}$ and $[Pt(NH_3)_4]^{2+}$ were extracted to obtain an electrode F of Example. It was confirmed in an analysis made separately that the amount of platinum supported on the electrode F was about 0.04 mg/cm$^2$.

Comparative Example 5

A mixed aqueous solution containing $H_2PtCl_6$ and $RuCl_3$ (molar ratio: 1:1) was prepared. Carbon particles (Vulcan XC-72, produced by Tanaka Kikinzoku K.K.) were impregnated with this mixed aqueous solution, washed, dried, and then subjected to reduction with a hydrogen gas (300° C.) to obtain a Pt—Ru/C having a Pt—Ru alloy supported on carbon. The amount of platinum supported on the carbon particles was 15 wt %.

A paste obtained by mixing the Pt—Ru/C and the same solid polymer electrolyte as used in Example 1 and PTFE particles was applied to an electrically-conductive porous carbon substrate (thickness; 0.5 mm) provided with water repellency, and then dried at a temperature of 120° C. in a nitrogen atmosphere for 1 hour to obtain an electrode G of Comparative Example. The amount of platinum supported on carbon was adjusted during the preparation of the paste such that the amount of platinum in the electrode G reached about 0.12 mg/cm$^2$.

The electrodes F and G of Example were then each connected to an ion-exchange membrane (Nafion; thickness: about 50 μm; produced by Du Pont Inc.) on both sides by a hot press (140° C.) to obtain two membrane-electrode assemblies bodies. These assemblies were each incorporated in a single cell holder for fuel cell to obtain cells F and G.

Figure 5:
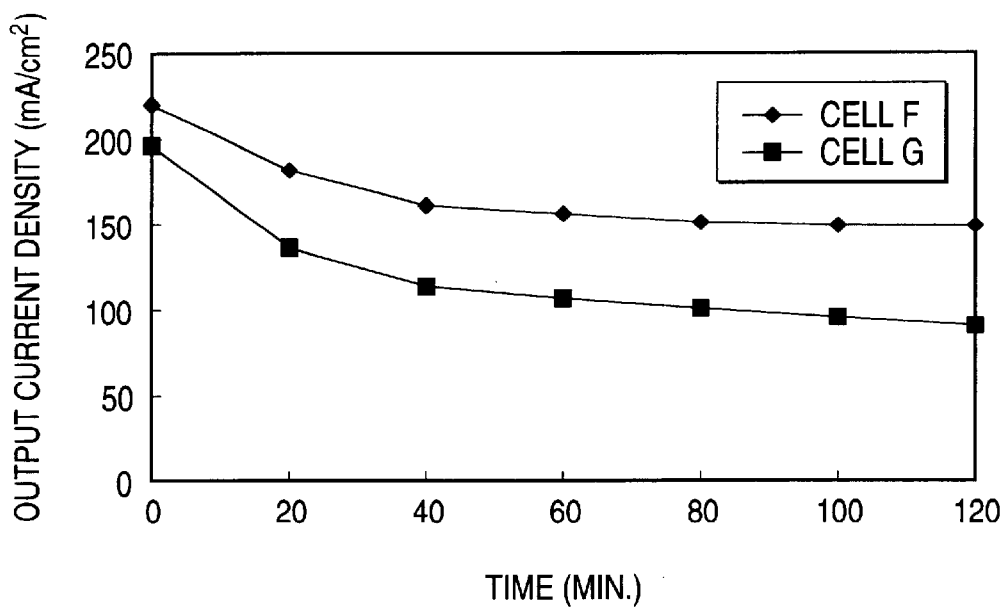
FIG. 5 shows output current-time characteristics of cells F and G.

FIG. 5 shows the output current-time characteristics measured when $O_2$ (2 atm, 80° C.) was supplied to the cathode of the cells F and G, a mixture of $H_2$ and CO (CO: 10 ppm, 2 atm, 90° C.) was supplied to the anode of these cells and the output was fixed to 0.6 V.

As can be seen in FIG. 5, the cell F of the invention shows higher output characteristics as the conventional cell G despite the loaded amount of platinum of the cell F that is only about one third of that of the cell G. This is because the cell F has a high percent utilization of catalyst metal and the coating of the ruthenium nucleus with an outer layer of platinum allows the improvement of CO resistance.

Example 5

A cation-exchange resin solution (5 wt % solution of Nafion, produced by Aldrich Inc.) and carbon particles (Vulcan XC-72) were well mixed, and then heated and concentrated to make a paste. The paste thus obtained was applied to a polymer (FEP) film to form a film of the paste (thickness: about 13 μm), and then dried at room temperature.

Subsequently, the foregoing mixture of a cation-exchange resin and carbon particles was soaked in a 50 mmol/l aqueous solution of $[Pt(NH_3)_4]Cl_2$ for 2 days to undergo ion-exchange reaction that causes $[Pt(NH_3)_4]^{2+}$ to be adsorbed preferentially to the proton-conductive passage in the cation-exchange resin (adsorption step). The mixture was thoroughly washed with deionized water, dried, and then reduced by hydrogen of 180° C. at 10 atm for about 2 hours (reduction step) so that platinum was supported preferentially on the site where the surface of the carbon particles contacts the proton-conductive passage in the cation-exchange resin.

The foregoing adsorption step and reduction step were then repeated twice. Subsequently, the mixture was soaked in a 0.5 mol/l sulfuric acid overnight so that unnecessary $[Pt(NH_3)_4]^{2+}$ in the mixture which had been left unreduced at the reduction step was extracted to obtain an electrode H of Example. It was confirmed by chemical analysis made separately that the amount of platinum supported on the electrode H was about 0.04 mg/cm$^2$.

Comparative Example 6

The same mixture containing a cation-exchange resin and carbon particles as obtained in Example 1 was soaked in a 50 mmol/l aqueous solution of $[Pt(NH3)_4]Cl_2$ for 2 days to undergo ion-exchange reaction that causes $[Pt(NH_3)_4]^{2+}$ to be adsorbed preferentially to the proton-conductive passage in the cation-exchange resin (adsorption step). The mixture was thoroughly washed with deionized water, dried, and then reduced by hydrogen of 180° C. at 1 atm for about 4 hours (reduction step) so that platinum was supported preferentially on the site where the surface of the carbon particles contacts the proton-conductive passage in the cation-exchange resin.

The foregoing adsorption step and reduction step were then repeated twice. Subsequently, the mixture was soaked in a 0.5 mol/l sulfuric acid overnight so that unnecessary $[Pt(NH_3)_4]^{2+}$ in the mixture which had been left unreduced at the reduction step was extracted to obtain an electrode I of Example. It was confirmed in an analysis made separately that the amount of platinum supported on the electrode I was about 0.04 mg/cm$^2$.

Comparative Example 7

The same mixture containing a cation-exchange resin and carbon particles as obtained in Example 1 was soaked in a 50 mmol/l aqueous solution of $[Pt(NH_3)_4]Cl_2$ for 2 days to undergo ion-exchange reaction that causes $[Pt(NH_3)_4]^{2+}$ to be adsorbed preferentially to the proton-conductive passage in the cation-exchange resin (adsorption step). The mixture was thoroughly washed with deionized water, dried, and then reduced by hydrogen of 180° C. at 1 atm for 2 hours (reduction step) so that platinum was supported preferentially on the site where the surface of the carbon particles contacts the proton-conductive passage in the cation-exchange resin.

The foregoing adsorption step and reduction step were then repeated twice. Subsequently, the mixture was dipped in a 0.5 mol/l sulfuric acid overnight so that unnecessary $[Pt(NH_3)_4]^{2+}$ in the mixture which had been left unreduced at the reduction step was extracted to obtain an electrode J of Example. It was confirmed by chemical analysis that the amount of platinum supported on the electrode J was about 0.01 mg/cm$^2$.

The reason why the amount of platinum supported on the electrode J is one fourth of that of the electrodes H and I is that despite its reduction time as short as 2 hours, the electrode J is prepared by reducing at a low pressure (atmosphere), causing $[Pt(NH_3)_4]^{2+}$ adsorbed to the interior of the electrode partially left unreduced, which is later extracted when soaked in a 0.5 mol/l sulfuric acid.

Figure 7:
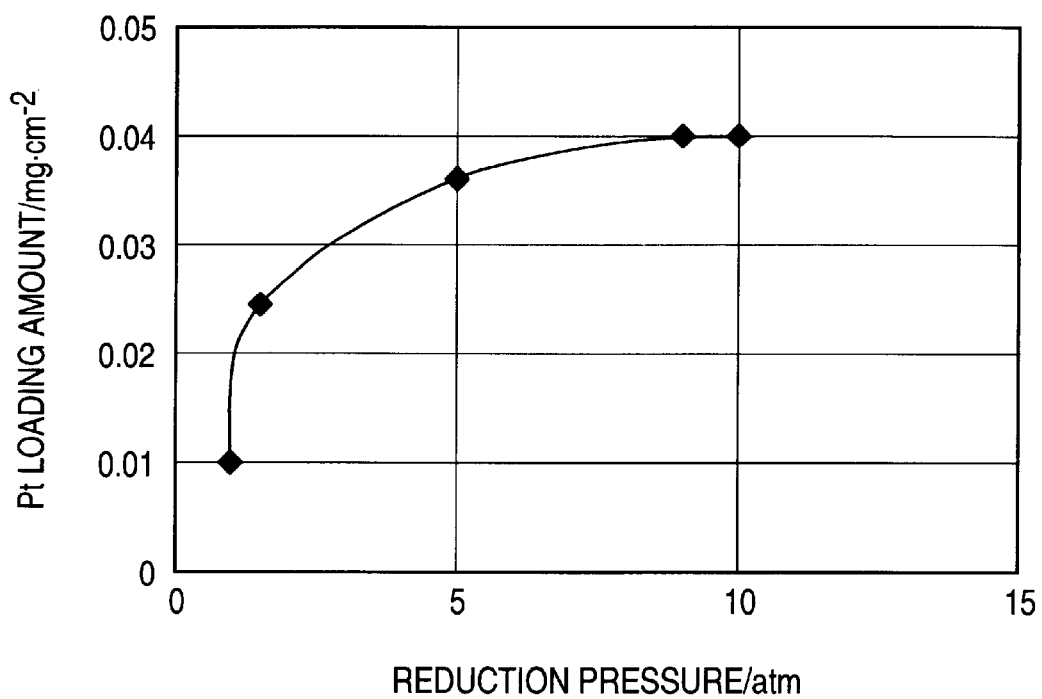
FIG. 7 shows a reduction pressure-Pt loading amount characteristic of electrode J.

Electrodes were prepared in the same manner as the electrode J except that the hydrogen reduction conditions were changed to 1.5 atm, 5 atm and 9 atm at 180° C. for 2 hours. FIG. 7 shows the amount of platinum supported on these electrodes. As can be seen in FIG. 7, when the reducing gas pressure is 1.5 atm or higher, the supported amount of platinum is twice or more times that at 1 atm (electrode J). When the reducing gas pressure is 5 atm, the supported amount of platinum is 80% or more of that of the electrode H (10 atm). When the reducing gas pressure is 9 atm, the supported amount of platinum is almost the same as that of the electrode H. In other words, the higher the pressure of hydrogen or mixed gas containing hydrogen during the reduction of catalyst metal is, the better is the resulting effect. In particular, the reducing gas pressure is preferably 1.5 atm or more, more preferably 5 atm or more, particularly 9 atm or more, at which the resulting effect is good.

Figure 6:
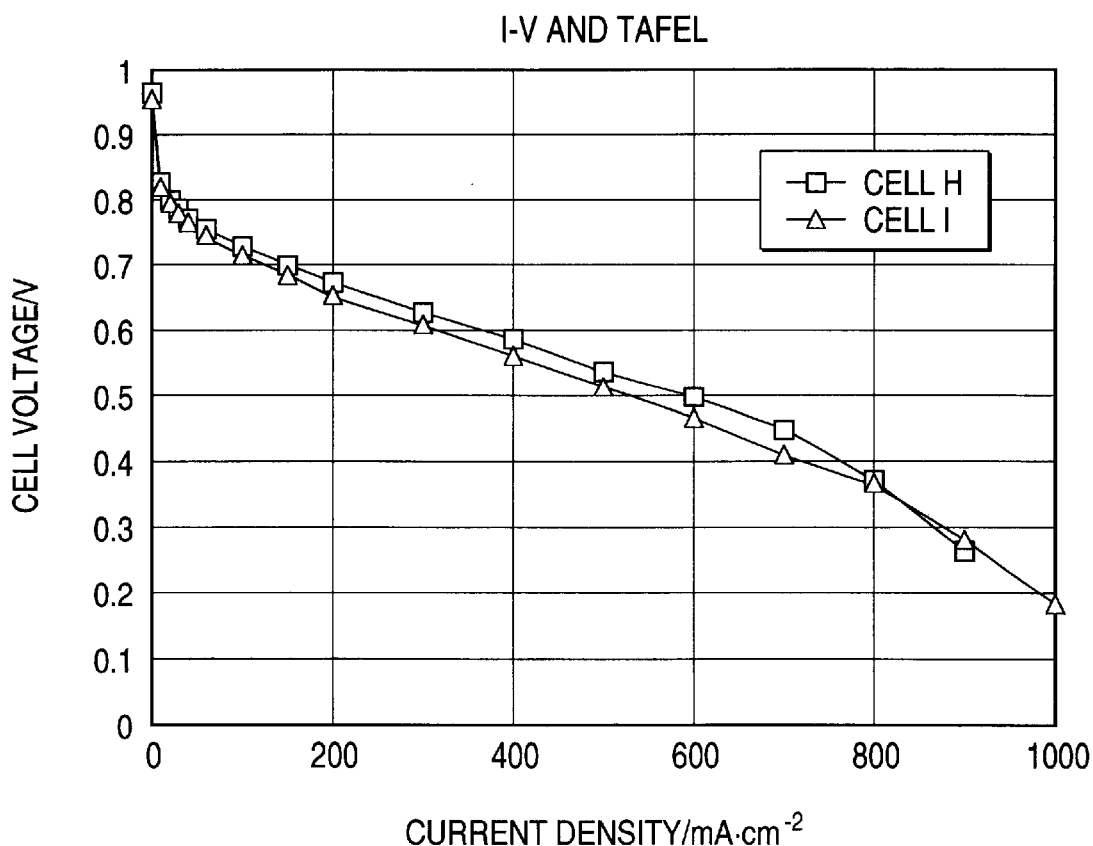
FIG. 6 shows current-voltage characteristics of cells H and I.

The electrodes H and I having a sufficient supported amount of platinum were each then connected to an ion-exchange membrane (Nafion; thickness: about 50 µm; produced by Du Pont Inc.) on both sides by a hot press (140° C.) to obtain three types of two membrane-electrode assemblies. To these assemblies were each connected an electrically-conductive porous carbon paper provided with water repellency on the both electrodes by a hot press. These assemblies were each then incorporated in a single cell holder for fuel cell to obtain cells H and I, respectively. As can be seen in FIG. 6, the cell H with the electrode H of the invention gives a higher output voltage than the cell I with the electrode I. This is because the electrode H is less liable to degradation of cation-exchange resin therein at the step of reduction with hydrogen gas, giving a high proton conduction in the electrode and hence making it possible to obtain a high performance electrode.

Example 8

A cation-exchange resin (Nafion 5 wt % solution available from Aldrich Corp.) was mixed with carbon particles (Vulcan XC-72, produced by Tanaka Kikinzoku K.K.) to form a paste. The paste was applied onto a hydrophobic carbon substrate of conductive porous material (0.5 mm), which was tried in an atmosphere of nitrogen for one hour at 100° C.

Subsequently, a mixture of the cation-exchange resin and carbon particles was immersed in a mixed solution of $[Ru(NH_3)_6]Cl_3$ and $[Pt(NH_3)_4]Cl_2$ of 50 mm mol/l (Ru/Pt= ⅓) respectively for 24 hours so that $[Ru(NH_3)_6]^{2+}$ and $[Pt(NH_3)_4]^{2+}$ were absorbed into the proton conductive passage of the cation-exchange resin through the ion-exchange reaction (first step). Therefore, the product was sufficiently rinsed in deionized water and dried, and then reduced by hydrogen for about six hours at 200° C. under 30 atm (second step). The first step and second step were repeated once more.

The product was immersed for two hour in a sulfuric acid of 0.5 mol/l to extract unnecessary $[Ru(NH_3)_6]^{2+}$ and $[Pt(NH_3)_4]^{2+}$ to acquire electrode K. According to the analysis performed separately, it was confirmed that the amount of platinum loaded into the electrode K is 0.08 mg/cm

Comparative Example 4

The carbon particles (Vulcan XC 72) are impregnated with amixed solution of $H_2PtC_{16}$ and $RuC_{12}$ (mol ratio 1:1). The product, after having been rinsed and dried, was reduced by hydrogen gas (300° C.). Thus, carbon supporting an alloy of Pt and Ru was acquired. It was found that the amount of platinum loaded on the carbon particle was 15 wt %.

This Pt—Ru supported on carbon was mixed with the solid polymer electrolyte as used in Example 1 and PTFE particles to form a paste. The paste was applied onto a hydrophobic carbon substrate of conductive porous material (0.5 mm), which was dried in an atmosphere of nitrogen for one hour at 120° C. to provide electrodes L in this comparative example. The amount of the Pt—Ru loaded on carbon when the paste was formed was adjusted so that the amount of platinum loaded in the electrode L was about 0.16 mg/cm$^2$.

The electrodes K and L were bonded to both surface of an ion-exchange membrane (Nafion having a thickness of 50 µm available from DUPON CO.) by hot press (140° C.) each other to provide two kind of membrane electrode assemblies. They were assembled into fuel cell holder to provide cells K and L.

The changes in the currents of the cells K and L were measured with a fixed output voltage of 0.55 V using a cathode supply gas of $O_2$ (2 atm, 80° C.) and anode supply gas of a mixed gas of $H_2$ and CO (CO: 10 ppm, 2 atm, 90° C.). The changes in the output currents of the cells K and L are shown in FIG. 8.

Figure 8:
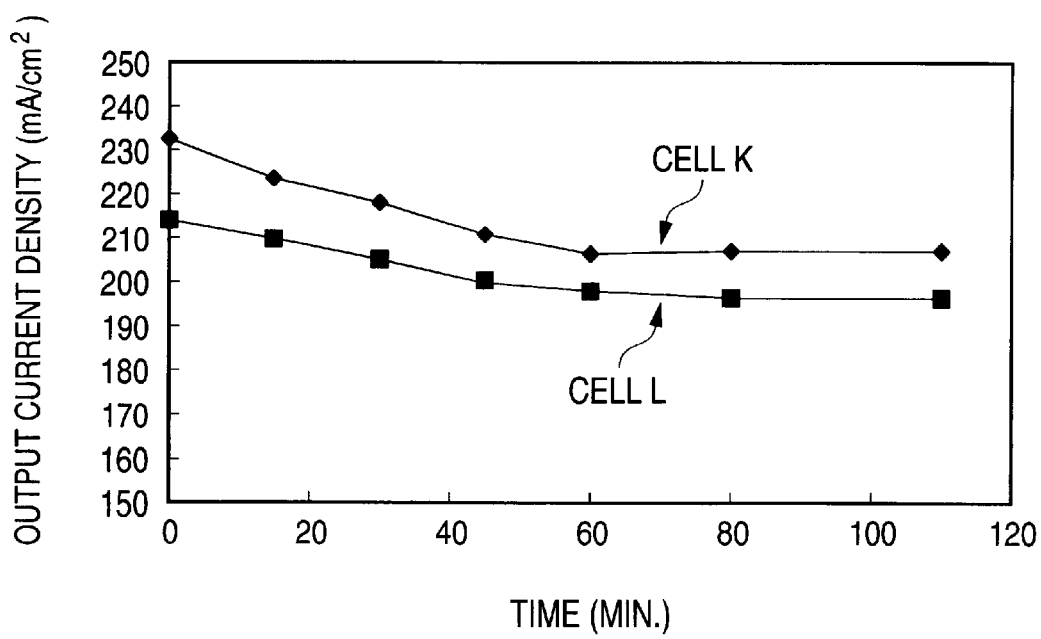
FIG. 8 shows current-voltage characteristics of cell K and L.
Figure 9:
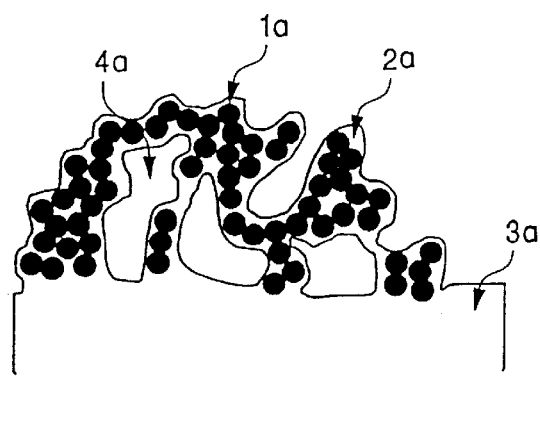
FIG. 9 shows an example of structure of a conventional cation-exchange resin-catalyst composite electrode.
Figure 10:
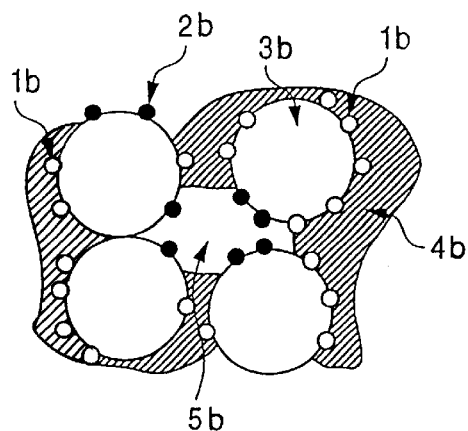
FIG. 10 shows another example of structure of a conventional cation-exchange resin-catalyst composite electrode.

It can be seen from FIG. 8 that the cell K exhibits a high output characteristic although its amount of platinum which is only ½ as large as the conventional cell L. This is probably because the electrode according to the present invention improve the catalyst utilization and alloying rate, and resulting in improvement of the CO tolerance characteristic.

The electrode for fuel cell according to the invention can provide an electrode having a high activity and a high percent utilization of catalyst that makes it possible to obtain an inexpensive high performance fuel cell having a high CO resistance or high activity against the electrochemical oxidation reaction of methanol.

Further, in accordance with the process for the production of an electrode for fuel cell of the invention, a catalyst metal can be supported on a three phase boundary formed on the site where the surface of carbon particles, making it possible to allow all the catalyst metal to act effectively on the three phase boundary and hence activate the electrode, not to mention the enhancement of the percent utilization of catalyst metal. Further, a high efficiency electrode for fuel cell can be produced from a small amount of catalyst metal.

Moreover, in accordance with the process for the production of an electrode for fuel cell of the invention, a catalyst metal having a nucleus made of a metal (X) covered by an shell made of a metal (Y) can be supported preferentially on the three boundary interface in the electrode, making it possible to produce an electrode having the same performance as the conventional electrode even with a small supported amount of platinum group metal. Accordingly, an inexpensive high performance fuel cell can be produced.

What is claimed is:

1. An electrode for a fuel cell, comprising:
   a solid polymer electrolyte-catalyst composite electrode containing a cation-exchange resin, a carbon particle and a catalyst metal;
   wherein the catalyst metal is loaded mainly on a site where a surface of the carbon particle contacts a proton-conductive passage in the resin.

2. An electrode for a fuel cell, comprising:
   a solid polymer electrolyte-catalyst composite electrode containing a cation-exchange resin, a carbon particle and a catalyst metal;
   wherein an amount of said catalyst metal loaded on a site where a surface of the carbon particle contacts a proton-conductive passage exceeds 50 wt % of the total supported amount of catalyst metal in the electrode.

3. The electrode for a fuel cell as in claims 1 or 2, wherein said catalyst metal comprises a nucleus containing a first metal and a shell containing a second metal which is not contained in said nucleus.

4. The electrode for a fuel cell according to claim 3, wherein said first metal is one belonging to a group other than a platinum group and said second metal is one belonging to the platinum group.

5. The electrode for a fuel cell according to claim 4, wherein said first metal belonging to the group other than the platinum group is one selected from the group consisting of magnesium, aluminum, vanadium, chromium, manganese, iron, cobalt, nickel, copper, zinc, silver and tungsten.

6. The electrode for a fuel cell according to claim 3, wherein said first metal and said second metal are selected from the group consisting of platinum, ruthenium, rhodium, palladium and iridium.

7. A process for the production of an electrode for a fuel cell comprising:
   a first step of absorbing a cation of a catalyst metal element into a cation-exchange resin in a mixture of the resin and carbon particles by an ion-exchange reaction between the cation and a counter ion of the resin; and
   a second step of chemically reducing the cation in the mixture obtained at the first step.

8. The process for the production of an electrode for a fuel cell according to claim 7, wherein said catalyst metal element is a metal element belonging to a platinum group.

9. The process for the production of an electrode for a fuel cell according to claim 8, wherein said cation is a complex ion of metal belonging to the platinum group.

10. The process for the production of an electrode for a fuel cell according to claim 9, wherein said cation is an ammine complex ion of metal belonging to the platinum group.

11. The process for the production of an electrode for a fuel cell as in one of claims 7–10, wherein said cation is reduced by hydrogen gas or a mixed gas containing hydrogen at the second step.

12. The process for the production of an electrode for a fuel cell according to claim 11, wherein said hydrogen gas or mixed gas containing hydrogen has been pressurized.

13. The process for the production of an electrode for a fuel cell according to claim 12, wherein the pressure of said hydrogen gas or mixed gas containing hydrogen is 1.5 atm or more.

14. The process for the production of an electrode for a fuel cell as in one of claims 7–10, wherein the reduction of said cation at the second step is carried out at a temperature of 200° C. or lower.

15. The process for the production of an electrode for a fuel cell as in one of claims 7–10, wherein the reduction of said cation at the second step is carried out at a temperature lower than the temperature at which said cation existing only in a simple body of the cation-exchange resin is reduced.

16. A process for the production of an electrode for a fuel cell comprising:
   a first step of absorbing a cation of a first catalyst metal element into a cation-exchange resin in a mixture of the resin and a carbon particle by an ion-exchange reaction between a cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element.

17. The process for the production of an electrode for a fuel cell according to claim 16, wherein said first catalyst metal element is one belonging to a group other than a platinum group and said second catalyst metal element is one belonging to the platinum group.

18. The process for the production of an electrode for a fuel cell according to claim 17, wherein said first catalyst metal element belonging to the group other than the platinum group is one selected from the group consisting of magnesium, aluminum, vanadium, chromium, manganese, iron, cobalt, nickel, copper, zinc, silver and tungsten.

19. The process for the production of an electrode for a fuel cell according to claim 16, wherein said first catalyst metal element and said second catalyst metal element are selected from the group consisting of platinum, ruthenium, rhodium, palladium and iridium.

20. The process for the production of an electrode for a fuel cell as in one of claims 16–19, wherein said cations are reduced with hydrogen gas or a mixed gas containing hydrogen at at least one of the second and fourth steps.

21. The process for the production of an electrode for a fuel cell according to claim 20, wherein said hydrogen gas or mixed gas containing hydrogen has been pressurized.

22. The process for the production of an electrode for a fuel cell according to claim 21, wherein the pressure of said hydrogen gas or mixed gas containing hydrogen is 1.5 atm or more.

23. The process for the production of an electrode for a fuel cell according to claim 16, wherein the reduction of said cations at at least one of the second and fourth steps is carried out at a temperature of 200° C. or lower.

24. The process for the production of an electrode for a fuel cell as in one of claims 16–19 or 23, wherein the reduction of the cation at the second step is carried out at a temperature lower than the temperature at which said cation existing only in the simple body of the cation-exchange resin is reduced.

25. The electrode for a fuel cell as in claims 1 or 2, produced by a process for the production of an electrode for a fuel cell comprising:
   a first step of absorbing a cation of a catalyst metal element into a cation-exchange resin in a mixture of the resin and carbon particles by an ion-exchange reaction between the cation and a counter ion of the resin; and
   a second step of chemically reducing the cation in the mixture obtained at the first step.

26. The electrode for a fuel cell as in claims 1 or 2, produced by a process for the production of an electrode for a fuel cell comprising:
   a first step of absorbing a cation of a first catalyst metal element into a cation-exchange resin in a mixture of the resin and a carbon particle by an ion-exchange reaction between a cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element.

27. The electrode for a fuel cell as in claim 4, produced by a process for the production of an electrode for a fuel cell comprising:
   a first step of absorbing a cation of a first catalyst metal element into a cation-exchange resin in a mixture of the resin and a carbon particle by an ion-exchange reaction between a cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element, and
   wherein said first catalyst metal element is one belonging to a group other than a platinum group and said second catalyst metal element is one belonging to the platinum group.

28. The electrode for a fuel cell according to claim 6, produced by a process for the production of an electrode for a fuel cell comprising:
   a first step of absorbing a cation of a first catalyst metal element into a cation-exchange resin in a mixture of the resin and a carbon particle by an ion-exchange reaction between a cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element, and
   wherein said first catalyst metal element and said second catalyst metal element are selected from the group consisting of platinum, ruthenium, rhodium, palladium and iridium.

29. A solid polymer fuel cell comprising an electrode for a fuel cell as in claims 1 or 2, produced by a process comprising:
   a first step of absorbing a cation of a catalyst metal element into a cation-exchange resin in a mixture of the resin and carbon particles by an ion-exchange reaction between the cation and a counter ion of the resin; and
   a second step of chemically reducing the cation in the mixture obtained at the first step.

30. A fuel cell using reformed fuel gas or a direct methanol fuel cell with an electrode as in claim 3, or an electrode obtained by a production process comprising:
   a first step of absorbing a cation of a first catalyst metal element into a cation-exchange resin in a mixture of the resin and a carbon particle by an ion-exchange reaction between the cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element.

31. A solid polymer fuel cell comprising an electrode for a fuel cell as in claims 1 or 2 and produced by a process comprising:
   a first step of absorbing a cation of a first catalyst metal element into a cation-exchange resin in a mixture of the resin and a carbon particle by an ion-exchange reaction between the cation and a counter ion of the resin;
   a second step of chemically reducing the cation in the mixture obtained at the first step;
   a third step of absorbing a cation of a second catalyst metal element into the resin by the ion-exchange reaction between the cation and the counter ion; and
   a fourth step of chemically reducing the cation in the mixture obtained at the third step,
   wherein the second catalyst metal element is different from the first catalyst metal element.

32. A fuel cell using reformed fuel gas or a direct methanol fuel cell with an electrode as in claim 26 or an electrode obtained by a production process comprising:

a first step of absorbing a cation of a first catalyst metal element into a cation-exchange resin in a mixture of the resin and a carbon particle by an ion-exchange reaction between the cation and a counter ion of the resin;

a second step of chemically reducing the cation in the mixture obtained at the first step;

a third step of absorbing a cation of a second catalyst metal element into the resin by the ion-exchange reaction between the cation and the counter ion; and a fourth step of chemically reducing the cation in the mixture obtained at the third step, wherein the second catalyst metal element is different from the first catalyst metal element.

* * * * *